US007305368B2

(12) United States Patent
Lieberman et al.

(10) Patent No.: US 7,305,368 B2
(45) Date of Patent: Dec. 4, 2007

(54) VIRTUAL DATA ENTRY DEVICE AND METHOD FOR INPUT OF ALPHANUMERIC AND OTHER DATA

(75) Inventors: Klony Lieberman, Jerusalem (IL); Yuval Sharon, Kohav Hashhar (IL); Eyal Naimi, Jerusalem (IL); Yaniv Maor, Jerusalem (IL); Mattan Tsachi, Modeen (IL); Boas Arnon, Halamish (IL); Amichai Turm, Beit Shemesh (IL)

(73) Assignee: VKB Inc., Wilmington, DE (US)

( * ) Notice: Subject to any disclaimer, the term of this patent is extended or adjusted under 35 U.S.C. 154(b) by 0 days.

(21) Appl. No.: 11/314,324

(22) Filed: Dec. 21, 2005

(65) Prior Publication Data
US 2006/0101349 A1 May 11, 2006

Related U.S. Application Data

(63) Continuation of application No. 09/866,859, filed on May 29, 2001, now Pat. No. 7,084,857.

(60) Provisional application No. 60/246,558, filed on Nov. 7, 2000.

(51) Int. Cl.
G06F 15/18 (2006.01)
(52) U.S. Cl. .................. 706/14; 706/48; 706/908
(58) Field of Classification Search ................ 345/156; 706/14, 48, 908
See application file for complete search history.

(56) References Cited

U.S. PATENT DOCUMENTS

| 4,553,842 A | 11/1985 | Griffin |
| 4,688,933 A | 8/1987 | Lapeyre |
| 4,782,328 A | 11/1988 | Denlinger |
| 4,843,568 A | 6/1989 | Krueger et al. |
| 5,181,181 A | 1/1993 | Glynn |
| 5,182,659 A | 1/1993 | Clay et al. |
| 5,502,514 A | 3/1996 | Vogeley et al. |
| 5,528,263 A | 6/1996 | Platzker et al. |
| 5,577,848 A | 11/1996 | Bowen |
| 5,581,484 A | 12/1996 | Prince |
| 5,595,449 A | 1/1997 | Vitkin |
| 5,633,691 A | 5/1997 | Vogeley et al. |

(Continued)

FOREIGN PATENT DOCUMENTS

DE 298 02 435 6/1998

(Continued)

OTHER PUBLICATIONS

Derwent WPI Abstract of DE 298 02 435 dated Jun. 18, 1998.

(Continued)

*Primary Examiner*—Joseph P Hirl
(74) *Attorney, Agent, or Firm*—Ladas & Parry LLP

(57) ABSTRACT

A data input device including an optically generated image of a data input device, the image including at least one input zone actuable by an action performed thereon by a user, a sensor operative to sense the action performed on the at least one input zone, and to generate signals in response to the action, and a processor in communication with the sensor operative to process the signals for performing an operation associated with the at least one input zone.

46 Claims, 23 Drawing Sheets

U.S. PATENT DOCUMENTS

| | | | |
|---|---|---|---|
| 5,677,978 A | 10/1997 | Lewis et al. |
| 5,705,878 A | 1/1998 | Lewis et al. |
| 5,734,375 A | 3/1998 | Knox et al. |
| 5,736,976 A | 4/1998 | Cheung |
| 5,748,183 A | 5/1998 | Yoshimura et al. |
| 5,748,512 A | 5/1998 | Bargas |
| 5,767,842 A | 6/1998 | Korth |
| 5,781,252 A | 7/1998 | Gale |
| 5,785,439 A | 7/1998 | Bowen |
| 5,786,810 A | 7/1998 | Knox et al. |
| 5,793,358 A | 8/1998 | Petkovic |
| 5,818,361 A | 10/1998 | Acevedo |
| 5,821,922 A | 10/1998 | Sellers |
| 5,831,601 A | 11/1998 | Vogeley et al. |
| 5,835,094 A | 11/1998 | Ermel et al. |
| 5,863,113 A | 1/1999 | Oe et al. |
| 5,864,334 A | 1/1999 | Sellers |
| 5,867,146 A | 2/1999 | Kim et al. |
| 5,880,712 A | 3/1999 | Goldman |
| 5,909,210 A | 6/1999 | Knox et al. |
| 5,914,481 A | 6/1999 | Danielson et al. |
| 5,914,709 A | 6/1999 | Graham et al. |
| 5,933,132 A | 8/1999 | Marshall et al. |
| 5,936,615 A | 8/1999 | Waters |
| 5,977,867 A | 11/1999 | Blouin |
| 5,986,261 A | 11/1999 | Lewis et al. |
| 6,005,556 A | 12/1999 | Kodama et al. |
| 6,031,519 A | 2/2000 | O'Brien |
| 6,043,805 A | 3/2000 | Hsich |
| 6,064,766 A | 5/2000 | Sklarew |
| 6,094,196 A | 7/2000 | Berry et al. |
| 6,097,375 A | 8/2000 | Byford |
| 6,100,538 A | 8/2000 | Ogawa |
| 6,104,384 A | 8/2000 | Moon et al. |
| 6,107,994 A | 8/2000 | Harada et al. |
| 6,149,062 A | 11/2000 | Danielson et al. |
| 6,266,048 B1 | 7/2001 | Carau |
| 6,281,878 B1 | 8/2001 | Montellese |
| 6,297,894 B1 | 10/2001 | Miller et al. |
| 6,377,238 B1 | 4/2002 | McPheters |
| 6,424,338 B1 | 7/2002 | Anderson |
| 6,435,682 B1 | 8/2002 | Kaelin et al. |
| 6,593,944 B1 | 7/2003 | Nicolas et al. |
| 6,607,277 B2 | 8/2003 | Yokoyama et al. |
| 6,611,252 B1 | 8/2003 | Dufaux |
| 6,614,422 B1 | 9/2003 | Rafii et al. |
| 6,650,318 B1 | 11/2003 | Arnon |
| 6,690,357 B1 | 2/2004 | Dunton et al. |
| 2005/0169527 A1 | 8/2005 | Longe et al. |

FOREIGN PATENT DOCUMENTS

| | | |
|---|---|---|
| EP | 0 982 676 | 3/2000 |
| EP | 1 039 365 | 9/2000 |
| WO | 00/21024 | 4/2000 |

OTHER PUBLICATIONS

Lieberman, et al. "A Virtual Data Entry Device and Method for Input of Alphanumberi and other Data".

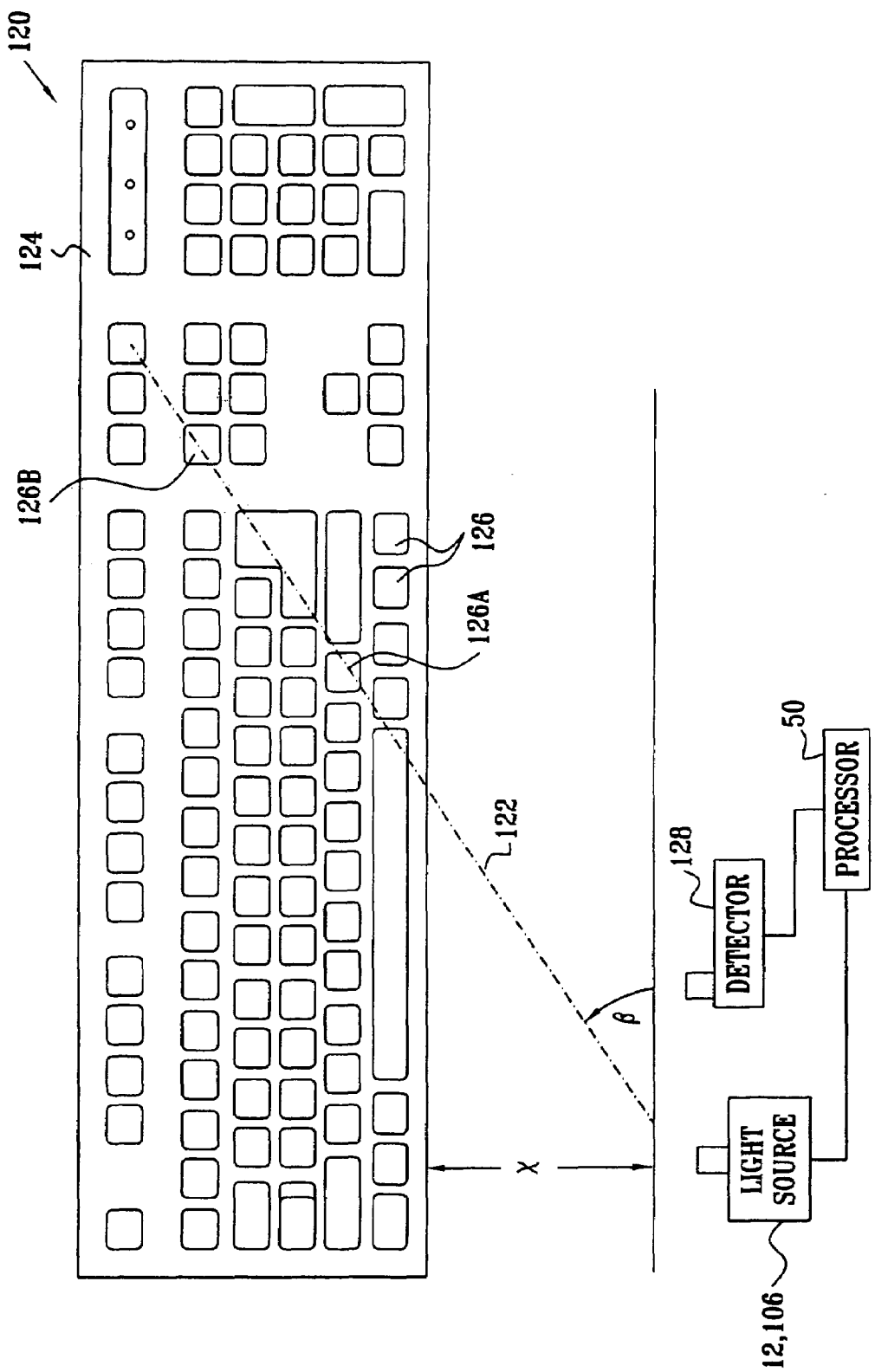

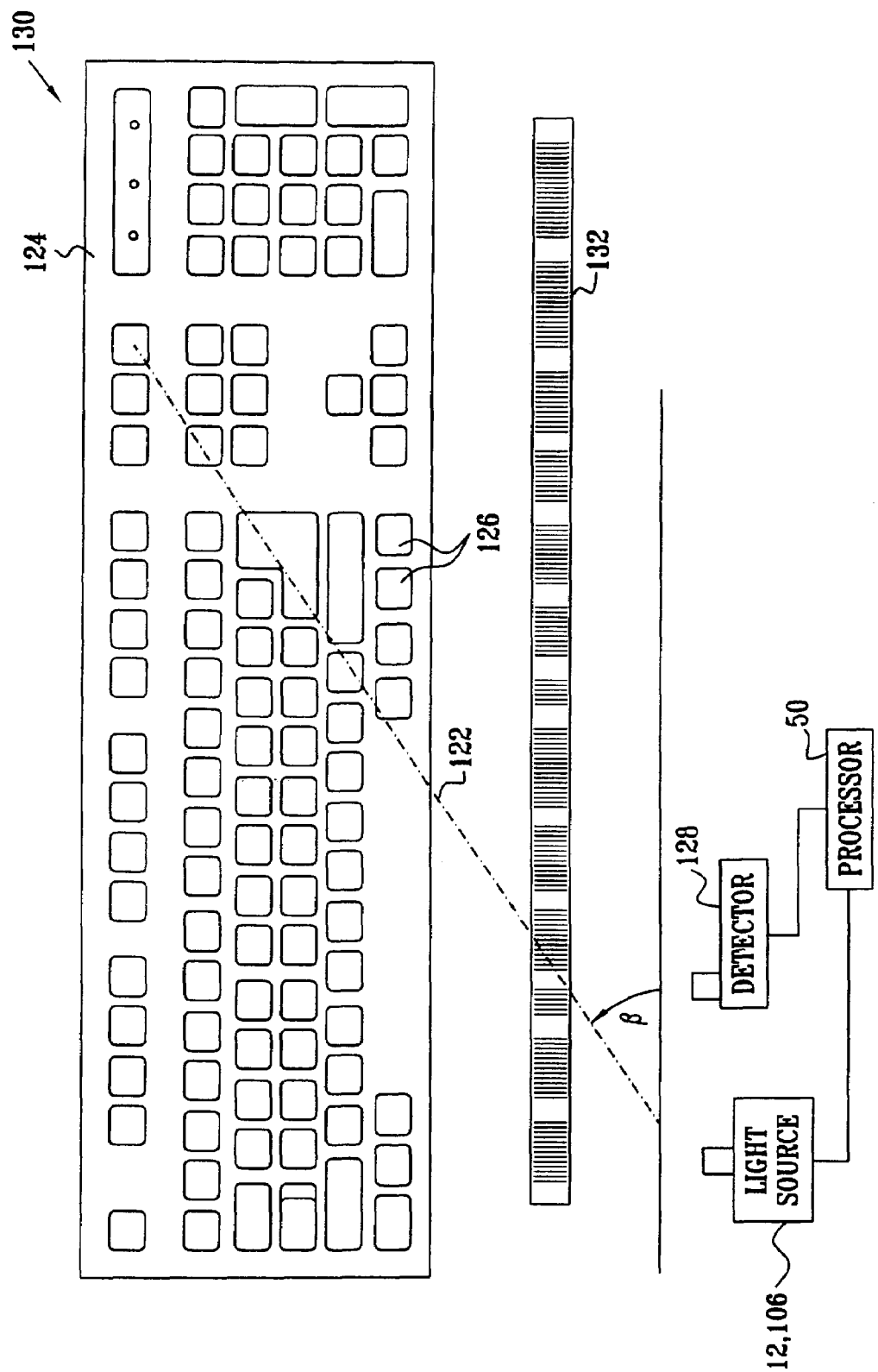

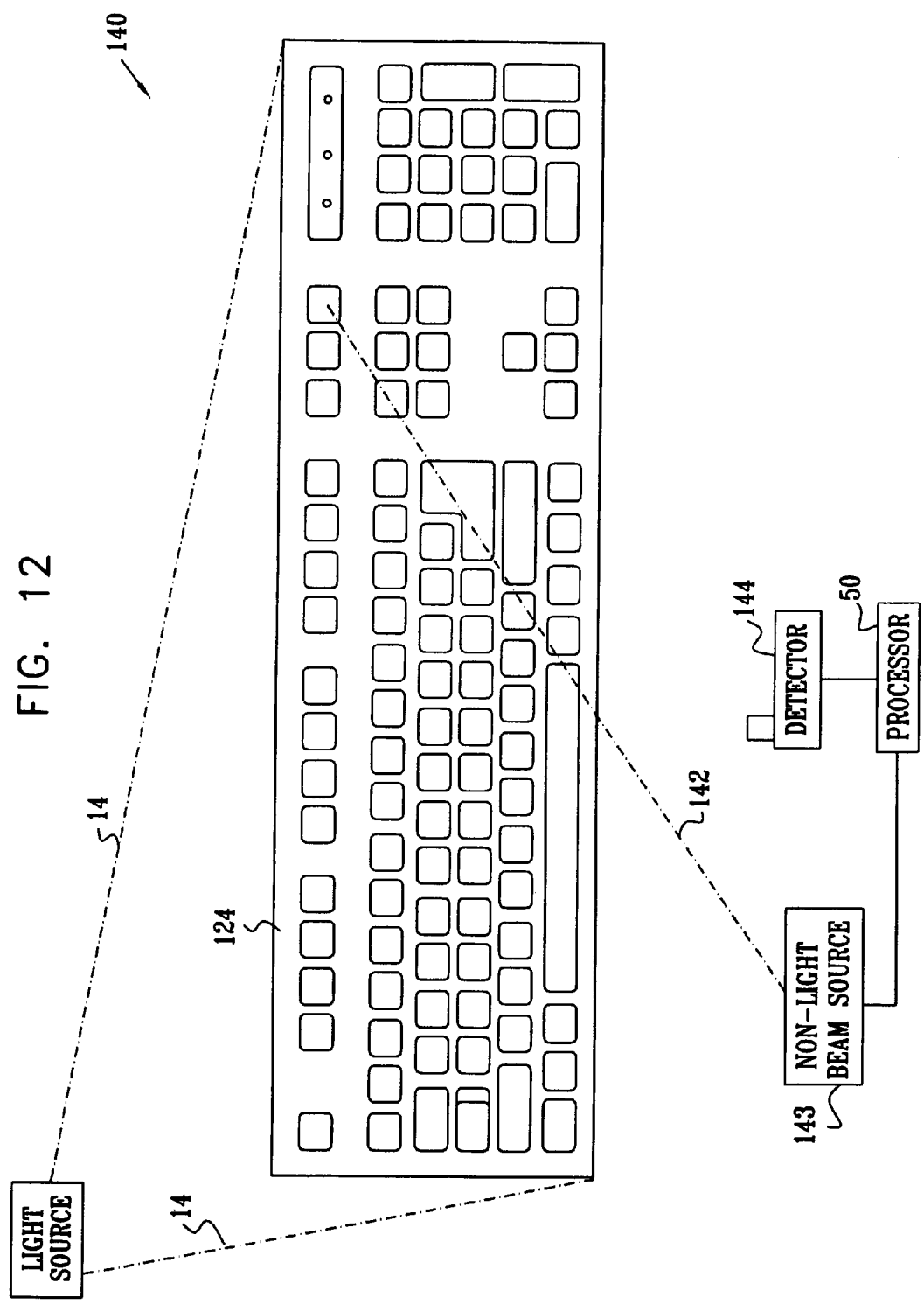

VIRTUAL DATA ENTRY DEVICE AND METHOD FOR INPUT OF ALPHANUMERIC AND OTHER DATA

REFERENCE TO CO-PENDING APPLICATIONS

This is a continuation of application Ser. No. 09/866,859 filed May 29, 2001, now U.S. Pat. No. 7,084,857 claims the benefit thereof and incorporates the same by reference. The copending application claims the benefit of U.S. Provisional Patent Application Ser. No. 60/246,558, filed Nov. 7, 2000, entitled "Virtual Data Entry Device and Method for Input of Alphanueric and Other Data".

FIELD OF THE INVENTION

The present invention relates to apparatus and methods for inputting information into a computer.

BACKGROUND OF THE INVENTION

The following U.S. Patents are believed to represent the current state of the art:

| | | | | | |
|---|---|---|---|---|---|
| 6,100,538 | 6,107,994 | 5,914,709 | 5,977,867 | 6,005,556 | 6,031,519 |
| 5,863,113 | 5,748,183 | 5,748,512 | 5,767,842 | 4,553,842 | 4,688,933 |
| 4,782,328 | 5,502,514 | 5,633,691 | 5,831,601 | 5,786,810 | 5,909,210 |
| 5,880,712 | 5,736,976 | 5,818,361 | 5,867,146 | 5,785,439 | 5,577,848 |
| 5,793,358 | 5,595,449 | 5,581,484 | 6,104,384 | 5,748,512 | 5,821,922 |
| 5,864,334 | 6,094,196 | 5,936,615 | 5,835,094 | 6,097,375 | 5,933,132 |
| 5,986,261 | 5,705,878 | 5,677,978 | | | |

The following patent documents are believed to be most relevant to the present invention:
U.S. Pat. Nos. 5,734,375; 5,736,976; 5,767,842; 6,031,519; 6,043,805 and Published PCT Patent Application WO 00/21024.

SUMMARY OF THE INVENTION

The present invention seeks to provide improved apparatus and methodologies for inputting at least alpha-numeric information into a computer.

The present invention seeks to provide a novel and improved data input device. In many embodiments of the present invention, there is no physical input device in the usual sense of the word, rather an optical image of a data input device is generated. A light beam emanating from a light source (e.g., laser source) is preferably moved at high speed by means of a mirror array or scanner, for example, to form a two-dimensional or three-dimensional image of an input device, such as a keyboard with all of the keys, in which case the user presses "virtual" keys of a "virtual" optically generated keyboard. Another example of an optically generated input device is a "virtual" mouse, wherein pressing or touching an outlined area performs a "click". Other examples include "virtual" musical instruments, such as an organ, a "virtual" switch, a "virtual" telephone touch pad, and the like.

Preferably optical, acoustic, position or movement sensors sense the "pressing" or "striking" of virtual keys, and the sensed movement is sent to a processor which processes and interprets the "pressing" into the desired characters, instructions, information and data. The input may then be transmitted to a computer, mobile telephone, musical instrument, and the like. The laser and beam-moving apparatus are preferably housed in a unit approximately the same size as a cell phone, or even smaller. The laser and beam-moving apparatus may be provided separately from a cell phone, or may be a built-in unit manufactured integrally with the phone.

The present invention is particularly advantageous for mobile communication devices. A user can carry any conveniently small size cell phone, for example, plus the equivalently-sized laser unit of the invention. If the user wishes to type messages to be sent to the Internet via the cell phone, for example, the user simply generates a large size keyboard with the laser unit and comfortably types the commands and message, without having to grapple with multiple presses of keys or with too small keys, or with lugging a clumsy, large keyboard. The present invention thus enables user-friendly use of cell phones for communication on the Internet. The same holds true for palm-sized computer/calculators or PDAs (personal digital assistants).

The present invention also provides a multilingual keyboard. Current keyboards generally have at most two languages indicated on the keys, e.g., the local language and English. In the present invention, since the keys are "virtual", any language can be optically formed on the keys of the keyboard, and a suitable linguistic processor can interpret between the keyed-in language and any other language in which it is desired to transmit a message.

In another aspect of the invention, the user can modify the arrangement, size and shape of the virtual keys. In still another aspect of the invention, a holographic image of all or part of the virtual keyboard can be employed.

The image of the virtual keyboard can be constructed by means of a monochromatic laser, or a blend of differently colored laser beams, either by using multiple laser sources having different colors and wavelengths, or by using a single laser source and using color and wavelength splitters. Differently polarized light beams can also be used. The keyboard of the present invention can not only be used as the sole data input device, but can also be integrated with other conventional or non-conventional data input devices.

There is thus provided in accordance with a preferred embodiment of the present invention a data input device including an optically generated image of a data input device, the image including at least one input zone actuable by an action performed thereon by a user, a sensor operative to sense the action performed on the at least one input zone, and to generate signals in response to the action, and a processor in communication with the sensor operative to process the signals for performing an operation associated with the at least one input zone.

In accordance with a preferred embodiment of the present invention a light source is provided which generates a light beam, and beam-moving apparatus is provided which moves the light beam to generate the optically generated image of the data input device.

Further in accordance with a preferred embodiment of the present invention the beam-moving apparatus includes a mirror arranged to reflect the light beam, and an actuator operatively connected to the mirror, wherein the actuator moves the mirror to reflect the light beam to form at least a two-dimensional image of the data input device.

Still further in accordance with a preferred embodiment of the present invention the beam-moving apparatus includes a scanner arranged to scan the light beam, and an actuator operatively connected to the scanner, wherein the actuator moves the scanner to scan the light beam in order to form at least a two-dimensional image of the data input device.

In accordance with a preferred embodiment of the present invention the data input device may include a key of a keyboard, a keyboard, a mouse with at least one input button or a key of a touch pad.

Further in accordance with a preferred embodiment of the present invention the sensor may include an optical sensor (such as a CCD or PSD), an acoustic sensor or a movement sensor.

Still further in accordance with a preferred embodiment of the present invention the processor is in communication with an output device, such as a computer, a mobile telephone, a switch or a palm-held computer/calculator.

There is also provided in accordance with a preferred embodiment of the present invention a method for data input including generating an optical image of a data input device, the image including at least one input zone actuable by an action performed thereon by a user, performing an action on the at least one input zone, sensing the action performed on the at least one input zone, generating signals in response to the action, and processing the signals for performing an operation associated with the at least one input zone.

In accordance with a preferred embodiment of the present invention the step of generating the optical image includes generating an image of a keyboard and the step of performing an action includes pressing keys defined by the image of the keyboard.

Further in accordance with a preferred embodiment of the present invention the step of processing the signals causes typing alphanumeric characters on a computer, cell phone, palm-sized computer/calculator or PDA.

In accordance with a preferred embodiment of the present invention the method further includes modifying the image of the keyboard so as to modify a configuration of keys of the keyboard.

Additionally in accordance with a preferred embodiment of the present invention the method further includes optically generating an image of characters of a first language on keys of the keyboard, selecting a second language different from the first language, and optically generating an image of characters of the second language on keys of the keyboard.

Further in accordance with a preferred embodiment of the present invention the optical image of the data input device is a holographic image.

Still further in accordance with a preferred embodiment of the present invention the optical image of the data input device is generated by means of a monochromatic laser.

Additionally in accordance with a preferred embodiment of the present invention the optical image of the data input device is generated by means of multiple laser sources having different colors and wavelengths.

In accordance with a preferred embodiment of the present invention the optical image of the data input device is generated by employing a single laser source and using color and wavelength splitters to split light from the single laser source.

Further in accordance with a preferred embodiment of the present invention the optical image of the data input device is generated by means of differently polarized light beams.

In accordance with a preferred embodiment of the present invention the step of sensing includes detecting light reflected from an object within a silhouette of the image, and analyzing a reflection of the light to determine a spatial position of the object.

Further in accordance with a preferred embodiment of the present invention the step of sensing includes providing a light beam emanating from a light source detecting light reflected from an object within a silhouette of the image, corresponding to the light beam, and analyzing an angle of the light beam and a time for the beam to be reflected back from the object to a reference to determine a spatial position of the object.

Still further in accordance with a preferred embodiment of the present invention the reference includes an optically readable reference.

Additionally in accordance with a preferred embodiment of the present invention the optically readable reference includes a tangible bar code strip or an optically generated bar code strip.

In accordance with a preferred embodiment of the present invention the optical image of a data input device is generated by the same light beam whose reflection is used to determine the spatial position of the object.

Further in accordance with a preferred embodiment of the present invention the step of sensing includes providing a non-visible-light beam emanating from a non-visible-light source, detecting an image of the non-light impinging upon an object within a silhouette of the image of the data input device, and analyzing the image of the non-light to determine a spatial position of the object.

Still further in accordance with a preferred embodiment of the present invention the non-visible-light beam includes an infrared beam and the image of the non-light includes an infrared image of the object.

In accordance with a preferred embodiment of the present invention the object includes a finger and the step of analyzing includes analyzing a difference in the infrared images of the finger before and after pressing the finger.

Further in accordance with a preferred embodiment of the present invention the method includes detecting light reflected from an object within a silhouette of the image and preventing the image from impinging upon the object.

There is additionally provided in accordance with a preferred embodiment of the present invention apparatus for inputting at least alpha-numeric information into a computer including:

a projector, projecting an image of at least part of a keyboard onto an inert surface;

at least one sensor, sensing user indicator interaction with specific locations on the image of at least part of a keyboard; and at least alpha-numeric information generation circuitry employing an output from the at least one sensor for providing an at least alpha-numeric output.

Preferably, the apparatus also includes a wireless communicator operative to provide the at least alpha-numeric output in a wireless manner to a receiver. Preferably, the wireless communicator includes a cellular telephone or a personal digital assistant.

In accordance with a preferred embodiment of the present invention, the cellular telephone includes a housing, in which housing are mounted the projector, the at least one sensor and the at least alpha-numeric information generation circuitry.

In accordance with a preferred embodiment of the present invention a personal digital assistant includes a housing, in which housing are mounted the projector, the at least one sensor and the at least alpha-numeric information generation circuitry.

Preferably, the at least one sensor includes at least one infra-red or visible illuminator, directing infra-red or visible radiation over the image of at least part of a keyboard onto an inert surface and at least one infra-red or visible sensor for sensing infra-red or visible light scattered from at least one user indicator.

In accordance with a preferred embodiment, the user indicator is a user finger or user held stylus.

In accordance with a preferred embodiment, the projector includes a point light source illuminating a mask defining the image of at least part of a keyboard.

Preferably, the apparatus also includes a mirror directing light passing through the mask onto the inert surface.

Preferably, the apparatus also includes at least one lens directly light from the point source through the mask.

In a preferred embodiment the point light source includes a diode laser.

Preferably the mask is formed to define a distorted representation of the image of the at least part of a keyboard in order to compensate for distortions in the projector.

In another preferred embodiment the mask is a dynamically changeable mask.

In another preferred embodiment the infra-red illuminator includes a cylindrical reflecting element receiving light from a point source and producing a generally flat, generally radially-directed light distribution.

In another preferred embodiment at least one sensor includes an array of discrete sensing elements and at least one lens operative to image a region overlying each of a plurality of keyboard locations onto a corresponding at least one of the array of discrete sensing elements. Preferably, the at least one sensor includes an a position sensitive detector and at least one lens operative to image a region overlying each of a plurality of keyboard locations onto a corresponding region on the position sensing detector.

In another preferred embodiment the at least one infra-red illuminator is operative to direct infra-red radiation at a plurality of levels over the image of at least part of a keyboard and the at least one infra-red sensor is operative to sense infra-red light scattered from at least one user indicator at a plurality of locations therealong.

In another preferred embodiment the projector includes a diffractive optical element, which when illuminated produces the image of at least part of a keyboard onto the inert surface.

Preferably the projector includes a spatial light modulator, which when illuminated produces the image of at least part of a keyboard onto the inert surface.

Preferably the spatial light modulator includes a dynamic spatial light modulator which is responsive to an electrical input for producing a dynamic image onto the inert surface.

There is additionally provided in accordance with a preferred embodiment of the present invention apparatus for wireless system for web browsing including:

a wireless communicator providing web browsing functionality; and at least one projector mounted on the wireless communicator and projecting an image of a display onto a surface.

Preferably the apparatus also includes projecting an image of at least part of a keyboard onto a surface.

In accordance with another preferred embodiment of the wireless system for web browsing the apparatus includes:

a wireless communicator providing web browsing functionality;

at least one projector mounted on the wireless communicator and projecting an image of at least part of a keyboard onto a surface;

at least one sensor, sensing user indicator interaction with specific locations on the image of at least part of a keyboard; and at least alpha-numeric information generation circuitry employing an output from the at least one sensor for providing an at least alpha-numeric output.

Preferably the projector is also operative for projecting an image of a display onto a surface, whereby a user may readily view images produced during web browsing.

In another preferred embodiment there is provided a wireless system for web browsing which also includes:

at least one sensor, sensing user indicator interaction with specific locations on the image of the display; and web browsing input circuitry employing an output from the at least one senso for providing an at least one web browsing output based on user implement actuation of locations on the image of the display corresponding to web links.

In another preferred embodiment there is provided a wireless system for e mail communication which also includes:

a wireless communicator providing e mail communication functionality; and at least one projector mounted on the wireless communicator and projecting an image of a display onto a surface.

In accordance with another preferred embodiment of the present invention there is provided a wireless system for e mail communication which also includes:

a wireless communicator providing e mail communication functionality;

at least one projector mounted on the wireless communicator and projecting an image of at least part of a keyboard onto a surface.

Preferably the wireless system for e mail communication also includes:

at least one sensor, sensing user indicator interaction with specific locations on the image of at least part of a keyboard; and at least alpha-numeric information generation circuitry employing an output from the at least one sensor for providing an at least alpha-numeric output.

Preferably the wireless system for e mail communication is also operative for projecting an image of a display onto a surface, whereby a user may readily view messages during e mail communication.

Preferably the wireless system for e mail communication also includes at least one sensor, sensing user indicator interaction with specific locations on the image of the display; and e-mail communication input circuitry employing an output from the at least one sensor for providing an at least one e mail communication output based on user implement actuation of locations on the image of the display.

In accordance with another preferred embodiment of the present invention there is provided a wireless system for mobile commerce communication that also includes:

a wireless communicator providing mobile commerce communication functionality; and at least one projector mounted on the wireless communicator and projecting an image of a display onto a surface.

Preferably the wireless system for mobile commerce communication also includes at least one sensor sensing user indicator interaction with specific locations on the image of at least part of a keyboard; and at least alpha-numeric information generation circuitry employing an output from the at least one sensor for providing at least an mobile commerce communication output.

Preferably the wireless system for mobile commerce communication is also operative for projecting an image of a display onto a surface, whereby a user may readily view images produced during mobile commerce communication.

Preferably the wireless system for mobile commerce communication also includes:

at least one sensor, sensing user indicator interaction with specific locations on the image of the display; and mobile commerce communication input circuitry employing an output from the at least one sensor for providing an at least one mobile commerce communication output based on user implement actuation of locations on the image of the display corresponding to web links.

In another embodiment of the present invention the apparatus includes:

a projector that protects an image of at least part of a keyboard and of mouse functionality onto the inert surface; and the at least one sensor senses user indicator interaction with specific locations on the image of the mouse functionality.

In another embodiment of the present invention the apparatus includes apparatus for inputting at least cursor-control information into a computer including:

a projector, projecting an image of at least part of mouse functionality onto an inert surface;

at least one sensor, sensing user indicator interaction with specific locations on the image of at least said mouse functionality; and at least cursor control information generation circuitry employing an output from the at least one sensor for providing an at least a cursor control output.

BRIEF DESCRIPTION OF THE DRAWINGS

The present invention will be understood and appreciated more fully from the following detailed description, taken in conjunction with the drawings in which:

FIG. 10 is a simplified illustration of an optical sensor system for sensing input of data in any of the data input devices of the invention, constructed and operative in accordance with another preferred embodiment of the present invention, which uses one light beam to determine the position of the object defining the data input;

FIG. 11 is a simplified illustration of an optical sensor system for sensing input of data in any of the data input devices of the invention, constructed and operative in accordance with yet another preferred embodiment of the present invention, wherein a bar code reference is used to determine the position of the object defining the data input;

FIG. 12 is a simplified illustration of a sensor system for sensing input of data in any of the data input devices of the invention, constructed and operative in accordance with another preferred embodiment of the present invention, wherein a non-visible-light beam is used to determine the position of the data input;

DETAILED DESCRIPTION OF PREFERRED EMBODIMENTS

Figure 1:
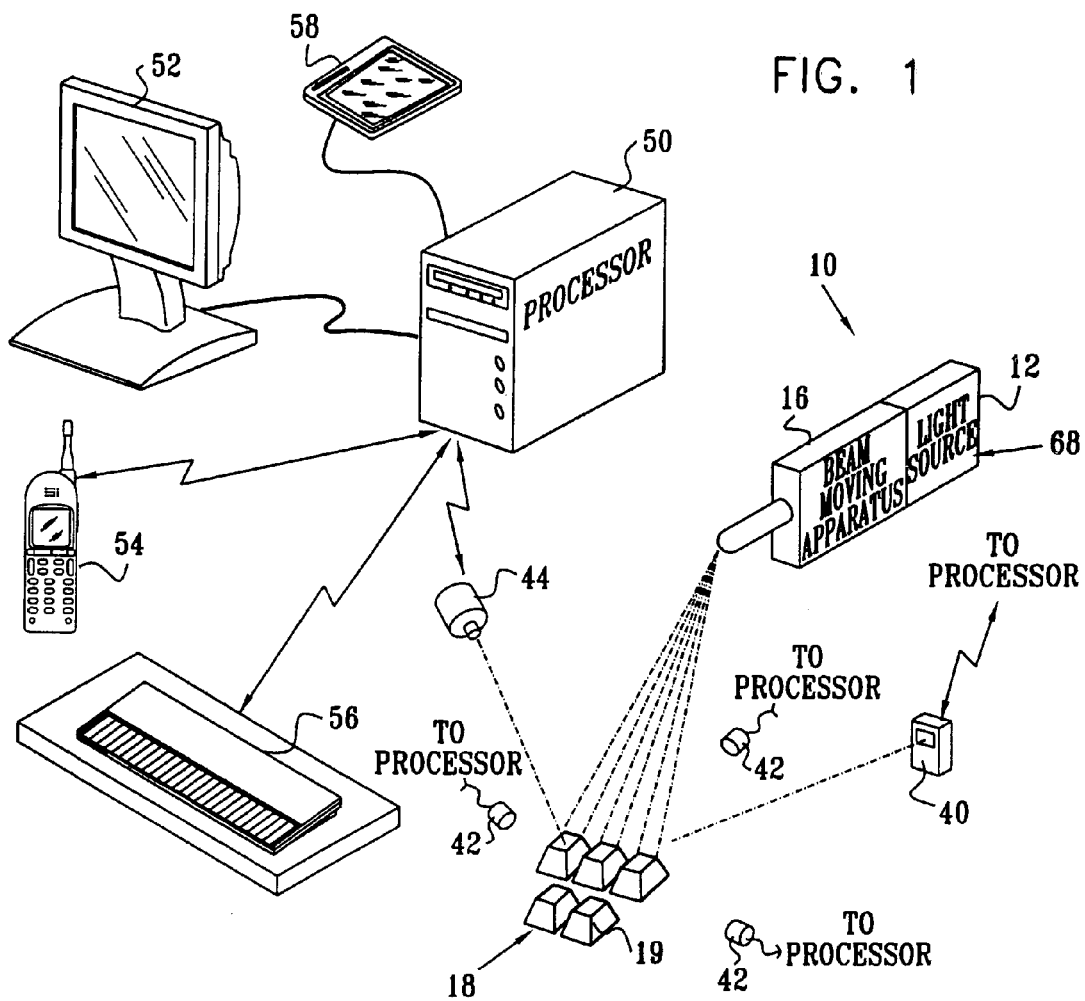
FIG. 1 is a simplified pictorial illustration of a system for data input constructed and operative in accordance with a preferred embodiment of the present invention.
Figure 2:
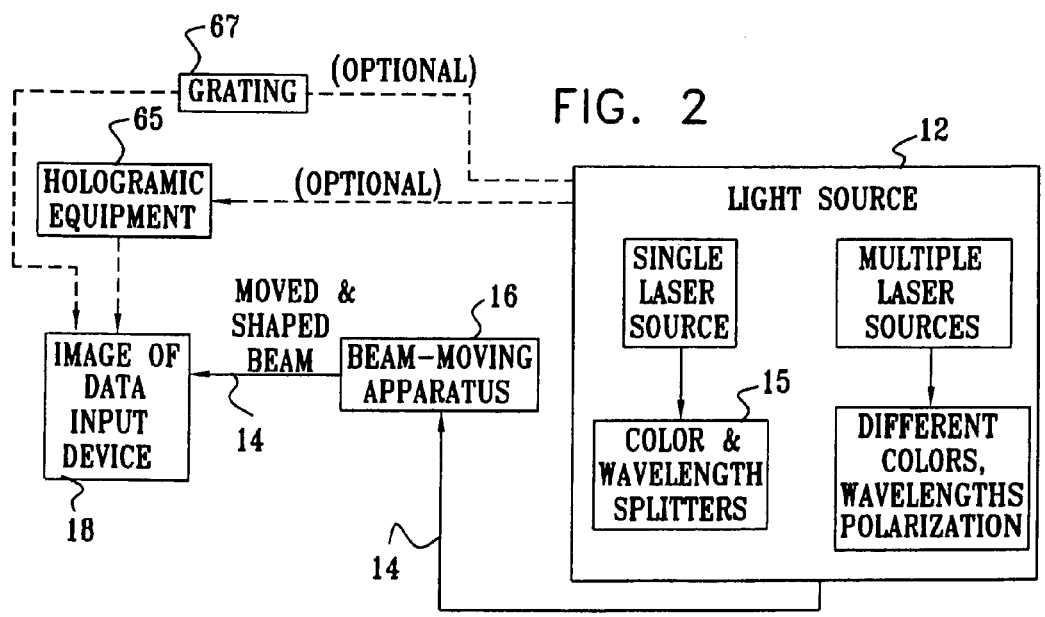
FIG. 2 is a simplified block diagram of a the system for the data input device of FIG. 1.

Reference is now made to FIGS. 1 and 2 which together illustrate a data input device 10 constructed and operative in accordance with a preferred embodiment of the present invention.

Data input device 10 preferably includes a light source 12 which generates a light beam 14. In accordance with one preferred embodiment of the present invention, light source 12 is a single laser source, such as a monochromatic laser. Color and wavelength splitters 15 may be provided to split light from the single laser source. Alternatively, multiple laser sources 12 having different colors and wavelengths, may be employed. Additionally or alternatively, light source 12 may generate differently polarized light beams.

Figure 3A:
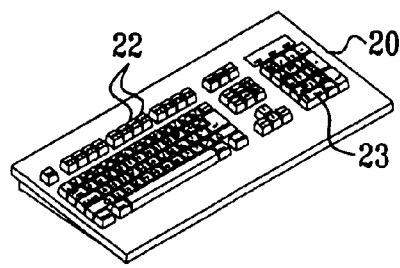
FIGS. 3A-3E are simplified pictorial illustrations of optically generated images of data input devices, constructed and operative in accordance with different preferred embodiments of the present invention.

Beam-moving apparatus 16, described more in detail hereinbelow, is preferably arranged with respect to light source 12 such that it moves light beam 14 to generate an optically generated image 18 of a data input device. Image 18 of the data input device preferably includes one or more input zones 19 actuable by an action performed thereon by a user, as will be readily understood by examples of images 18 shown in FIGS. 3A-3E. In FIG. 3A, an image of a keyboard 20 with keys 22 is generated. Keys 22 are the input zones, and a user "presses" keys 22 to input data. The manner in which the pressing is detected is described hereinbelow. Image 18 may include not only the silhouette of keys 22 but also alphanumeric characters 23 formed in the outline of each key 22.

Figure 3B:
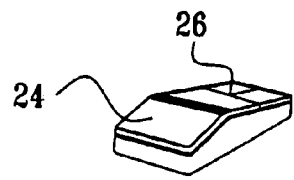
Figure 3C:
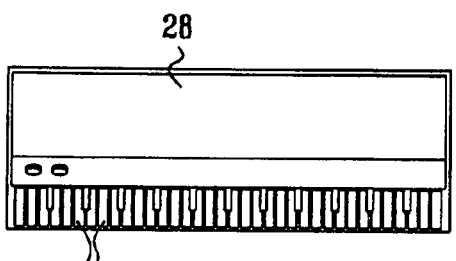

FIG. 3B illustrates another example of an optically generated input device, that of a mouse 24, wherein pressing or touching an outlined area of a button 26 performs a "click". Alternatively, moving a user's finger in the outlined area can also perform a function. Another example, shown in FIG. 3C, includes an optically generated image of a musical instrument 28, such as an organ with keys 30, wherein "pressing" keys 30 can generate musical notes.

Figures 3D, 3E:
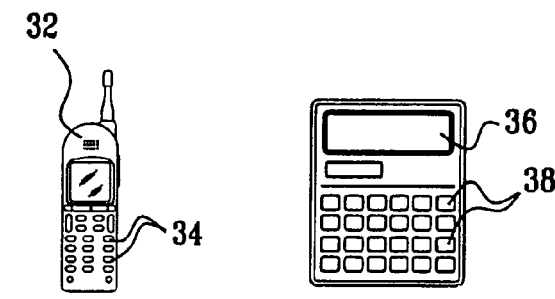

In FIG. 3D, an optically generated image of a device such as a cellphone 32, is provided with pad keys 34, wherein "pressing" one of keys 34 can generate alphanumeric characters. In FIG. 3E, an optically generated image of palm-held computer/calculator/PDA 36 is provided with keys or buttons 38, wherein "pressing" one of keys or buttons 38 can generate mathematical functions or alphanumeric characters. The pad keys 34 or keys 38 are also examples of "virtual" PDA switches that can be optically generated. Of course, any suitable kind of switch can be optically generated, such as single-pole and multi-pole switches, for example.

A sensor is preferably provided to sense the above described actions performed on the input zone 19. Many kinds of sensors can be employed to detect pressing any of the "virtual" keys of the embodiments shown in FIGS. 3A-3E. For example, as seen in FIG. 1, the sensor may be an optical sensor 40, such as an electronic camera CCD or position sensing device (PSD), whose field of view encompasses the "virtual" keyboard or touch pad, etc. Other examples of suitable sensors include an acoustic sensor 42 and a position or movement sensor 44. Three acoustic sensors 42 should preferably be used for sensing the action by means of triangulation. Any number of position or movement sensors can be used, and more than one kind of sensor can be employed in carrying out the invention. Other examples of suitable sensors are described hereinbelow with reference to FIGS. 8-10.

The sensors, upon sensing the "pressing" or "striking" of the "virtual" keys, preferably generate electrical signals based upon the sensed information and transmit the signal to a processor 50 which processes and interprets the signals into the desired characters, instructions, information and data, input by the user. Processor 50 is preferably in electrical communication with a device, such as a computer 52, mobile telephone 54, musical instrument 56, palm-held computer/calculator 58, and the like, which visually or audibly outputs the desired characters, instructions, information and data.

Figure 4A:
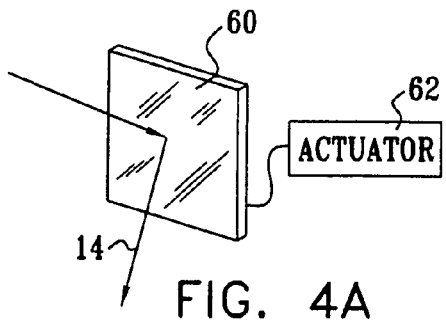
FIG. 4A is a simplified pictorial illustration of beam-moving apparatus constructed and operative in accordance with a preferred embodiment of the present invention, including a mirror array with actuators for moving the array.
Figure 4B:
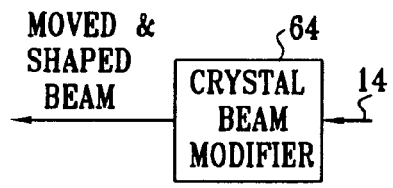
FIG. 4B is a simplified pictorial illustration of beam-moving apparatus useful in accordance with another preferred embodiment of the present invention, including a crystal beam modifier.
Figure 4C:
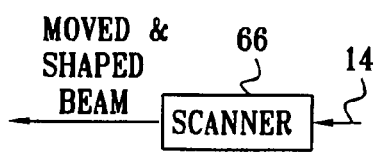
FIG. 4C is a simplified pictorial illustration of beam-moving apparatus constructed and operative in accordance with yet another preferred embodiment of the present invention, including a scanner.

In accordance with a preferred embodiment of the present invention, as shown in FIG. 4A, beam-moving apparatus 16 includes a mirror array 60 (one or more mirrors) arranged to reflect light beam 14, and an actuator, such as a servomotor 62, operatively connected to mirror array 60. Servomotor 62 preferably rapidly moves mirror array 60 to reflect light beam 14 to form an image of data input device 10. Another example is shown in FIG. 4B, wherein beam-moving apparatus 16 includes a crystal beam modifier 64. FIG. 4C illustrates yet another example of beam-moving apparatus 16, that of a scanner 66. In all cases, light beam 14 is rapidly moved to form an image of the data input device 40. Alternatively, a holographic image of data input device 10 can be produced by hologramic equipment 65 (FIG. 2). As another alternative, an image of data input device 10 can be produced by a grating 67 (FIG. 2).

Light source 12 and beam-moving apparatus 16 are preferably housed in a small laser unit 68 (FIG. 1). This makes the present invention particularly advantageous for mobile communication devices. For example, a user can carry any conveniently small size cell phone, for example, plus the small laser unit 68. If the user wishes to type messages to be sent to the Internet via the cell phone, for example, the user simply generates a large size keyboard with laser unit 68 and comfortably types the commands and message, without having to grapple with multiple presses of keys or with too small keys, or with lugging a clumsy, large keyboard. The present invention thus enables user-friendly use of cell phones for communication on the Internet. The same holds true for palm-sized computer/calculators, and other small data input devices. It is noted that the data input devices 10 of the present invention can not only be used as the sole data input device, but can also be integrated with other conventional or non-conventional data input devices.

Figure 5:
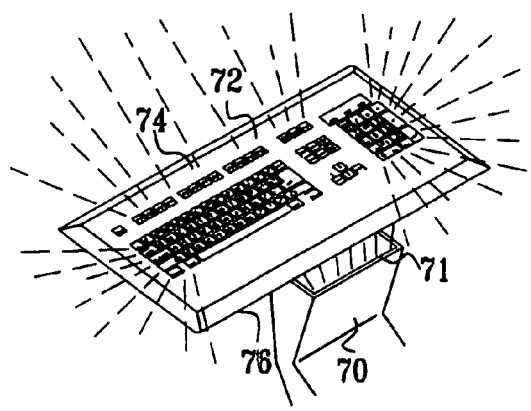
FIG. 5 is a simplified pictorial illustration of a data input device constructed and operative in accordance with another preferred embodiment of the present invention, including a light unit that projects an optical image of a data input device by projecting light from underneath a transparent or translucent substrate.

Although the above described laser unit 68 is considered the most preferred embodiment, nevertheless other light units can be used to generate the optical image of the data input device. For example, as shown in FIG. 5, a light unit 70 may project an optical image 72 of a data input device 74, such as a keyboard, by projecting light from underneath a transparent or translucent substrate 76. A reticle 71 may be provided with a template of the keyboard for producing the image 72, for example. The sensing of "pressing" the keys of the keyboard and processing signals generated by the sensor is preferably as described hereinabove.

Figure 6:
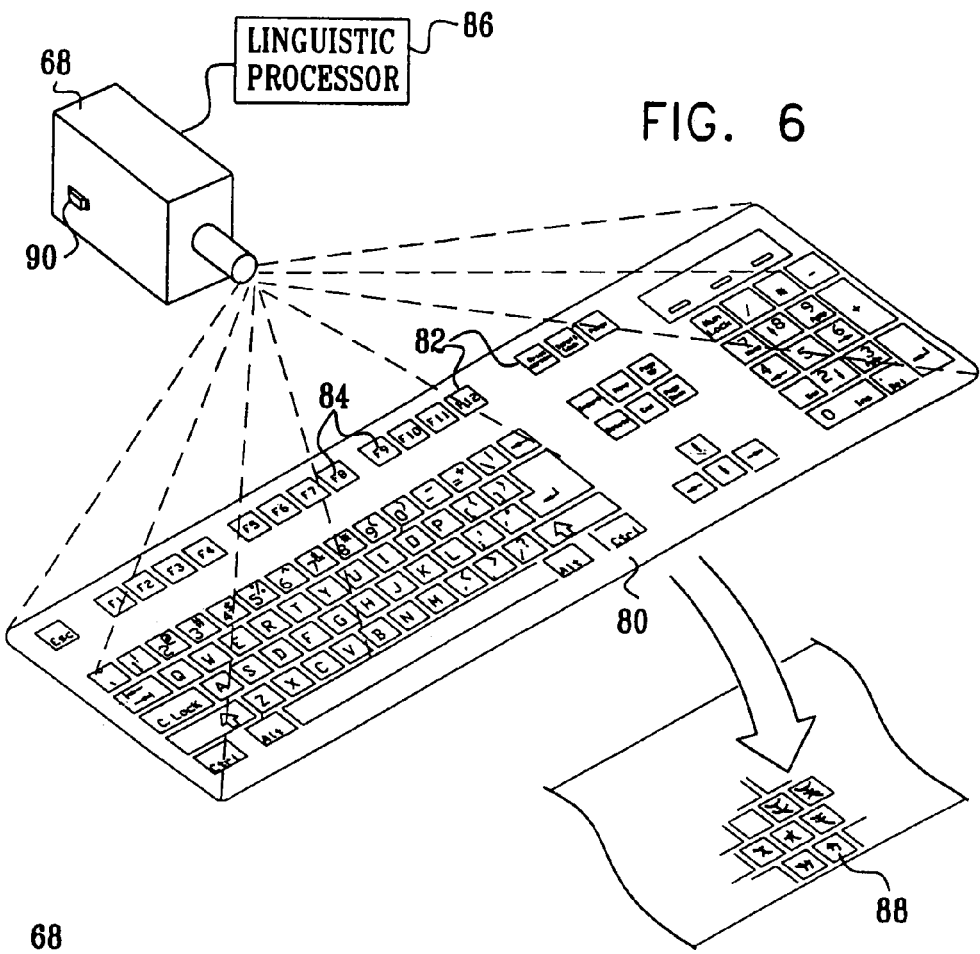
FIG. 6 is a simplified illustration of a multilingual keyboard, constructed and operative in accordance with a preferred embodiment of the present invention.

Reference is now made to FIG. 6 which illustrates a multilingual keyboard 80, constructed and operative in accordance with a preferred embodiment of the present invention. Keyboard 80 is preferably formed by laser unit 68, described hereinabove. Laser unit 68 preferably forms a silhouette of keys 82 with alphanumeric characters 84 formed in the outline of each key 82. In the embodiment of FIG. 6, a linguistic processor 86 is in electrical communication with laser unit 68. Linguistic processor 86 generates signals for modulating the laser beam from laser unit 68 to form letters of any suitable alphabet, as chosen by the user.

The user can choose the particular language in a number of ways. For example, as shown in FIG. 6, laser unit 68 can first display a standard "qwertyuiop" layout of keys 82 in English. The user can then type in English the desired language, other than English, whereupon the processor 86 recognizes the desired language and signals the laser unit 68 to generate a different set of key patterns 88 and text 84 formed in the outline of each key 82.

Additionally or alternatively, switches 90 may be provided for switching between languages. It is important to note that the different set of keys 88 does not necessarily have the same amount or layout as the standard "qwertyuiop" layout of keys 82 in English. Linguistic processor 86 is also operative to interpret between the keyed-in language and any other language in which it is desired to transmit a message. For example, a Japanese user interested in a website of a Hungarian company, can command laser unit 68 to generate an optical image of a Japanese keyboard, and type a message in Japanese. Linguistic processor 86 then translates the Japanese message into Hungarian, and directs the translated message to the website.

It is noted that linguistic processor 86 may be locally connected to data input device 10, and may be part of its hardware. Alternatively, linguistic processor 86 can be provided on a remote server, and remotely accessed via the internet. The latter feature enables having an international linguistic interface for global communication.

Figure 7:
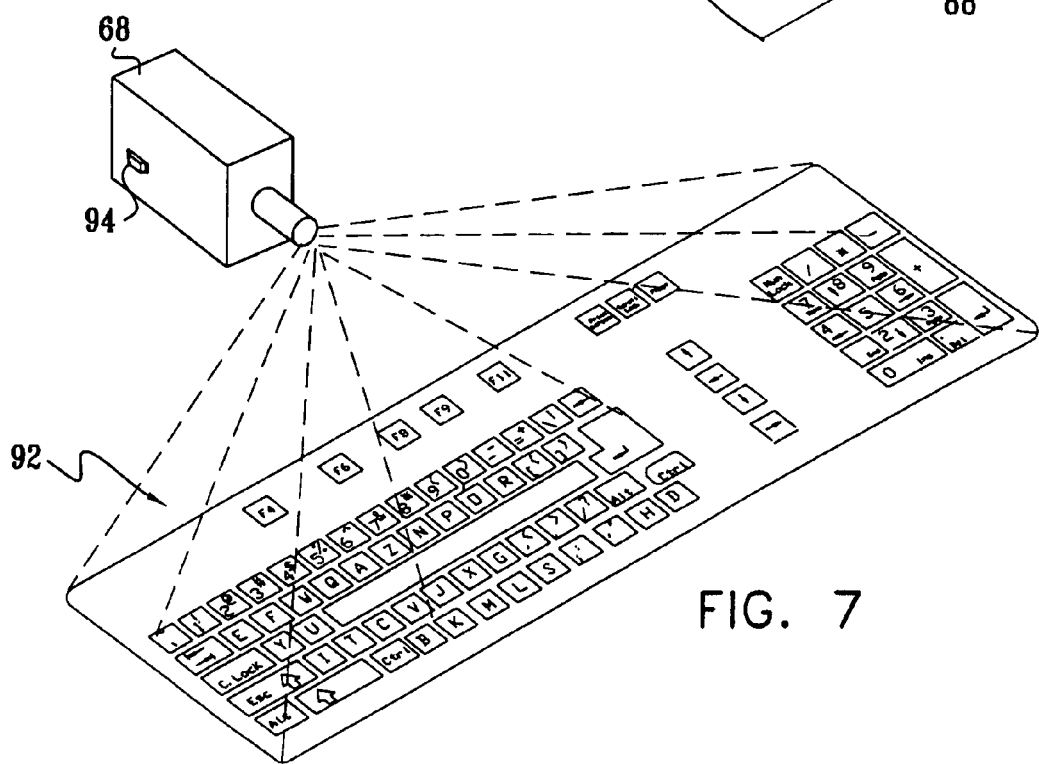
FIG. 7 is a simplified illustration of a non-standard layout of keys on an optically generated image of a keyboard, wherein a user can modify the arrangement, size and shape of the "virtual" keys, in accordance with a preferred embodiment of the present invention.

Reference is now made to FIG. 7 which illustrates that laser unit 68 can display a non-standard layout of keys 92. In accordance with a preferred embodiment of the present invention, the user can modify the arrangement, size and shape of keys 92, such as by typing in commands which are interpreted and processed by processor 50 to generate the desired arrangement. Additionally or alternatively, switches 94 or other hardware may be provided for selecting an arrangement of keys 92.

Figure 8:
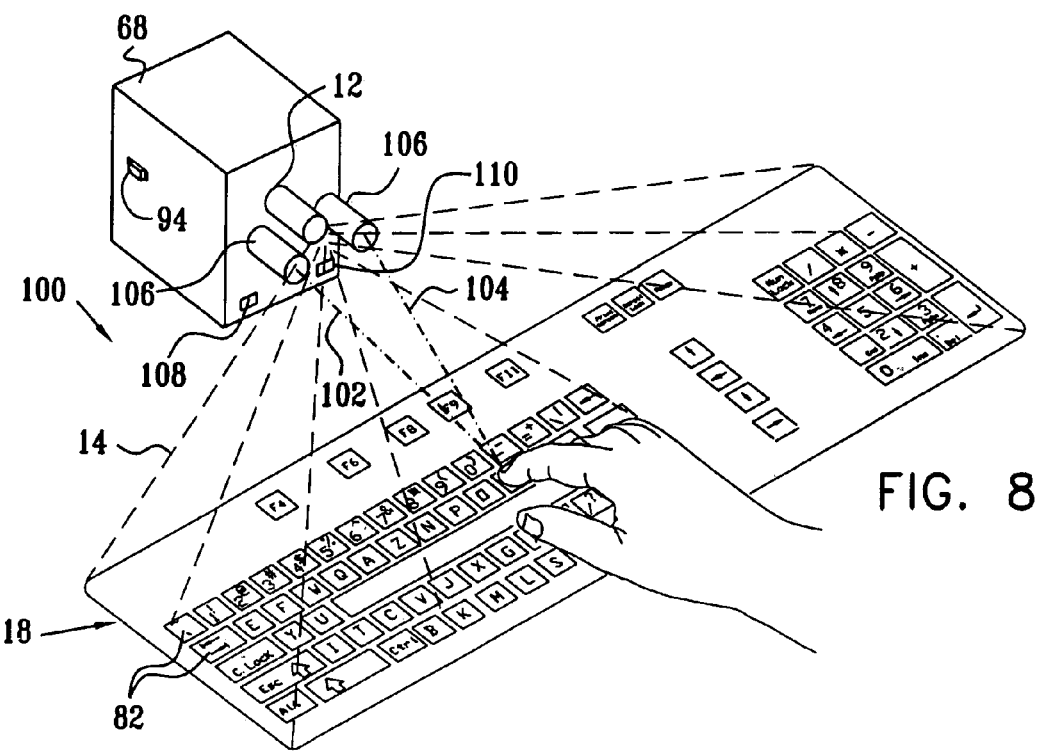
FIG. 8 is a simplified illustration of an optical sensor system for sensing input of data in any of the data input devices of the invention, constructed and operative in accordance with a preferred embodiment of the present invention, which uses two light beams to determine the position of the object defining the data input.

Reference is now made to FIG. 8 which illustrates an optical sensor system 100 for sensing input of data in any of the data input devices of the present invention, constructed and operative in accordance with a preferred embodiment of the present invention. Optical sensing system 100 preferably includes two light beams 102 and 104, different from light beam 14, to determine the position of the data input. Light beams 102 and 104 may emanate from light source 12 or from one or more additional light sources 106. Light beams 102 and 104 preferably cover the entire area of image 18, either by means of scanning or by having sufficient beam width to cover the entire area.

Figure 9A:
FIG. 9A is a simplified illustration of a light beam passing over the light-generated data input device of FIG. 8, with no object placed on the input zones.
Figure 9B:
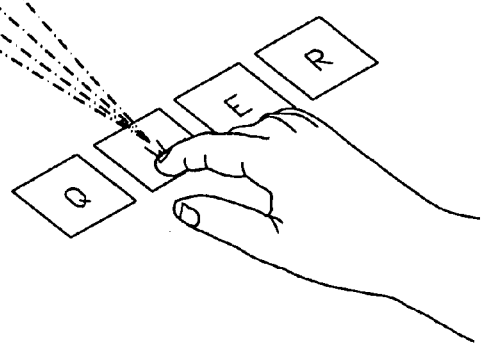
FIG. 9B is a simplified illustration of a light beam passing over the light-generated data input device of FIG. 8, with an object placed on one of the input zones.

A pair of light detectors 108 and 110 are preferably provided for detecting any light reflected from objects within the silhouette of image 18, corresponding to light beams 102 and 104, respectively. For example, as seen in FIG. 9A, if no object is in the silhouette of image 18, then light beam 102 is reflected and is detected by light detector 108. However, as seen in FIG. 9B, if a finger or other object is placed on one of input zones 19 of image 18, then light beam 102 has a new and different reflection detected by light detector 108. The same holds true for light beam 104. By analyzing the reflection of one of the light beams (102 or 104), such as with processor 50, the system knows the angle relative to the light source at which the object lies. By analyzing both of the reflections of light beams 102 and 104 and their intersection, the system knows the spatial position of the object. Finally, when the finger moves to press the virtual input zone 19, the movement of the finger causes yet another different set of reflections of light beams 102 and 104. The new reflections are analyzed to sense which input zone 19 was "pressed".

Reference is now made to FIG. 10 which illustrates an optical sensor system 120 for sensing input of data in any of the data input devices of the present invention, constructed and operative in accordance with another preferred embodiment of the present invention. Optical sensing system 120 differs from optical sensing system 100 in that optical sensing system 120 preferably includes one light beam 122 to determine the position of the data input. Light beam 122 may emanate from light source 12 or additional light source 106. Light beam 122 preferably covers the entire area of image 18, either by means of scanning or by having sufficient beam width to cover the entire area.

As seen in FIG. 10, light source 12 or 106 is preferably located at a fixed, known distance from a "virtual" keyboard 124. For a given angle, such as angle $\beta$, there are a plurality of "virtual" keys 126 in the path of light beam 122. The time for light beam 122 to impinge on a finger or other object placed on one of keys 126 and be reflected back to a light detector 128 is a function of the distance of the key 126 from light source 12 or 106. For example, the time for light beam 122 to be reflected from key 126A may be 60 picoseconds whereas the time for light beam 122 to be reflected from key 126B may be 100 picoseconds. Processor 50 preferably analyzes the angle and time data for light beams 122 and derives the spatial position of the finger. Finally, when the finger moves to press the particular key, such as key 126, the movement of the finger causes a different reflection of light beam 122. The new reflection is analyzed to sense which key 126 was "pressed".

Reference is now made to FIG. 11 which illustrates an optical sensor system 130 for sensing input of data in any of the data input devices of the present invention, constructed and operative in accordance with yet another preferred embodiment of the present invention. Optical sensing system 130 is preferably similar to the previously described optical sensing system 120, with like elements being designated by like numerals.

In optical sensing system 120, light-source 12 or 106 is preferably located at a fixed, known distance from keyboard 124 in order to determine the distance to the particular finger or object. Optical sensing system 130 differs from optical sensing system 120 in that sensing system 130 preferably uses an optically readable reference 132, such as a bar code, as a reference for determining the distance to the particular finger or object. Optically readable reference 132 may be a tangible bar code strip placed on a working surface by the user. Alternatively, optically readable reference 132 may be optically generated just like keyboard 124.

For a given angle, such as angle β, light beam 122 not only crosses over a plurality of keys 126, but also impinges upon a particular region of optically readable reference 132. The particular place of impingement on optically readable reference 132 determines the angle of light beam 122. Processor 50 can proceed to analyze the angle and time data for light beams 122 and derive the spatial position of the finger, as described hereinabove with reference to FIGS. 9A, 9B and 10.

The embodiments of FIGS. 8-11 have been described such that the light beams 102, 104 and 122 used to sense the input of data are different from the light beam 14 used to create the virtual keyboard. Alternatively, with appropriate circuitry or software, light beam 14 itself can be used as the light beam used to sense the input of data.

Reference is now made to FIG. 12 which illustrates a sensor system 140 for sensing input of data in any of the input devices of the present invention, constructed and operative accordance with yet another preferred embodiment of the present invention. Sensing system 140 is preferably similar to the previously described optical sensing systems 120 and 130, with like elements being designated by like numerals. Sensing system 140 differs from the previous optical sensing systems 100, 120 and 130 in that sensing system 140 preferably includes a non-visible-light beam 142 emanating from a non-visible-light source 143 to determine the position of the data input. Non-visible-light beam 142 is any beam of electromagnetic wave radiation whose wavelength is outside the range of visible light. Alternatively, non-visible-light beam 142 can be an acoustic beam. Most preferably, beam 142 is an infrared beam. Beam 142 preferably covers the entire area of image 18, either by means of scanning or by having sufficient beam width to cover the entire area.

Figure 13:
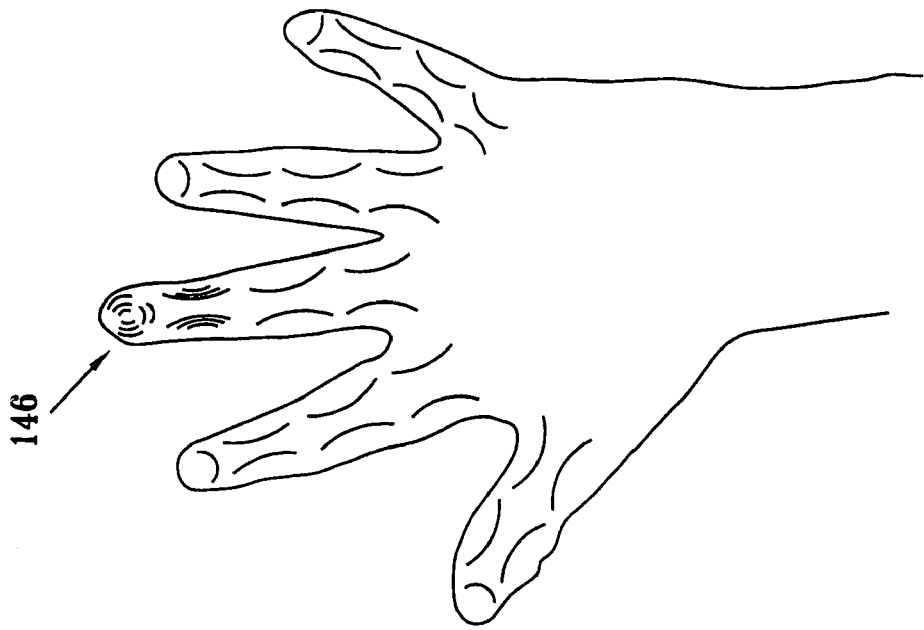
FIGS. 13 and 14 are simplified illustrations of two typical infrared images of fingers placed upon a "virtual" keyboard constructed in accordance with a preferred embodiment of the present invention.
Figure 14:
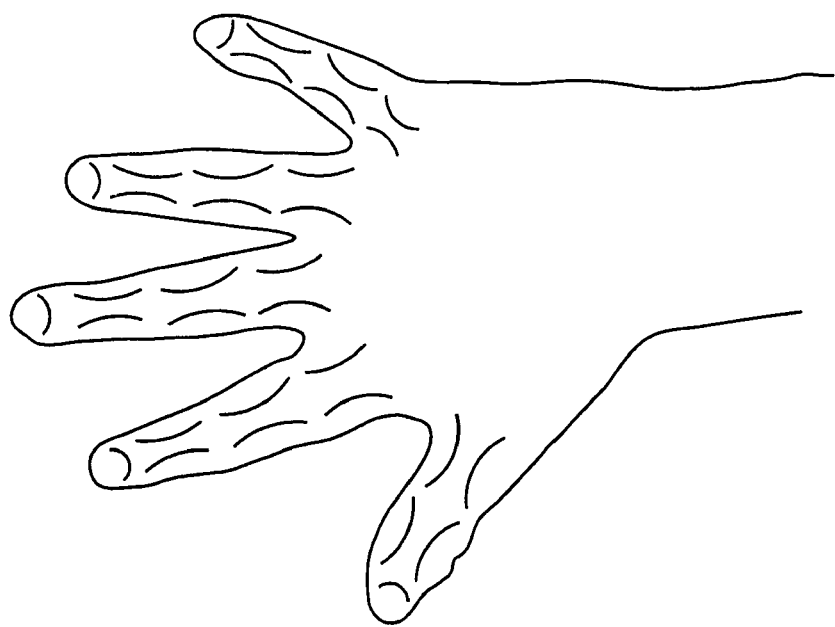

Reference is now made to FIGS. 13 and 14 which illustrate two typical infrared images of fingers placed upon the virtual keyboard 124. FIG. 13 shows an infrared image before one of the fingers presses a key 126. FIG. 14 shows an infrared image after pressing a key 126. It is seen that the act of pressing changes the blood flow to and from the tips of the fingers, and thus causes a different infrared image, such as seen at reference numeral 146. The difference in the infrared images between FIGS. 13 and 14, is preferably detected by an infrared detector 144 in electrical communication with processor 50. Processor 50 preferably analyzes the differences in the images and determines which key 126 was pressed.

Figure 15:
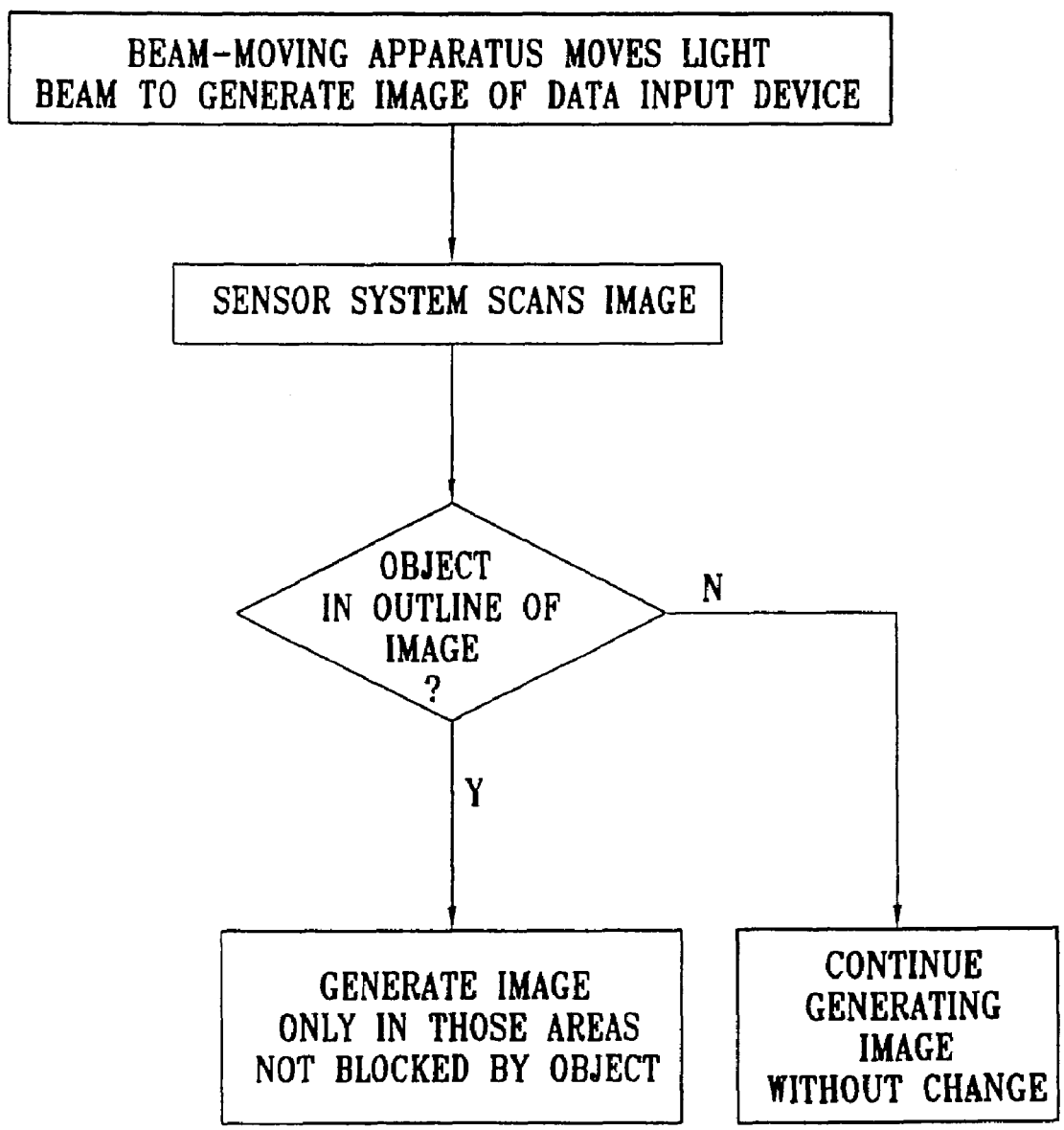
FIG. 15 is a simplified flow chart of a method for preventing displaying an image of a data input device on selected locations, in accordance with another preferred embodiment of the present invention.

When creating and projecting images of any of the input devices of the present invention, it is possible that portions of the image may fall upon fingers of the user. Although this does not affect the operation of the invention, nevertheless some users may desire that no portion of the image fall on their fingers. Reference is now made to FIG. 15 which illustrates a method for preventing displaying image of a data input device on selected locations, in accordance with another preferred embodiment of the present invention.

As described hereinabove, beam-moving apparatus 16 is arranged with respect to light source 12 such that it moves light beam 14 to generate generated image of the data input device. Any of the above-described sensor systems 100, 120, 130 or 140 scans the image 18 to detect data input as described hereinabove. The sensor system also detects the presence of an object, e.g., a hand or finger, in the outline of image 18. Since processor 50 knows the position of the hand or finger, as well as the position of light beam 14, processor 50 can instruct moving apparatus 16 and source 12 to cause light beam 14 to generate the image 18 only in those regions not covered by the fingers.

It is noted that any of the above-described sensor systems 100, 120, 130 or 140 can be used to detect data input and the like even without being used in conjunction with the generation of image 18. For example, any of the sensor systems of the invention can be used to detect finger movement on a "regular", tangible keyboard.

Figure 16:
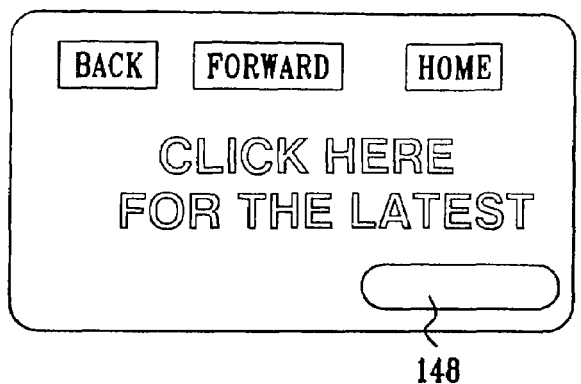
FIGS. 16 and 17 are simplified illustrations of generating images of data input devices in accordance with two preferred embodiments of the present invention, wherein in FIG. 16, a web page is light-generated, and wherein in FIG. 17, a game object is light-generated.
Figure 17:
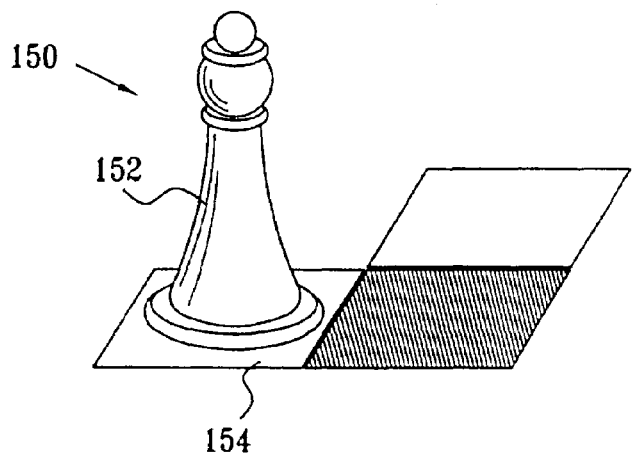

Reference is now made to FIGS. 16 and 17 which illustrate other examples of applications generating images of data input devices in accordance with preferred embodiments of the present invention. In FIG. 16, a light-generated web page is generated with any of the above-described apparatus for generating images of data input devices. A user can input data by "clicking" on a click zone 148, the click being detected as described hereinabove.

In FIG. 17, a light-generated game object 150, such as a chess piece 152 and chess board 154 are generated with any of the above-described apparatus for generating images of data input devices. A user can input data related to the game, such as "moving" the chess piece 152, with the input being detected as described hereinabove.

Figure 18:
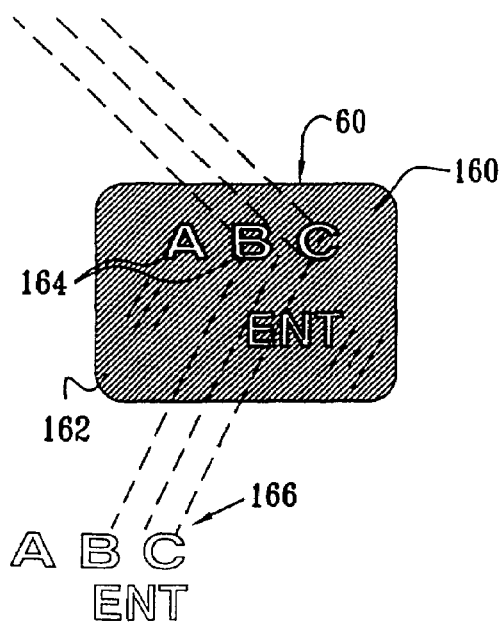
FIG. 18 is a simplified illustration of a mirror with one or more darkened portions for generating images of data input devices in accordance with another preferred embodiment of the present invention.

As mentioned hereinabove, laser unit 68 is considered the most preferred embodiment, but other light units can be used to generate the optical image of the data input device. Another example is shown in FIG. 18, mirror array 60 (described hereinabove with reference to FIG. 4A) may include a mirror 160 with a darkened portion 162 that does not reflect light, and clear portions 164 which do reflect light. The clear portions 164 are shaped like characters, numerals, letters or any other shape which it is desired to form a light-generated image 166 thereof.

Figure 19:
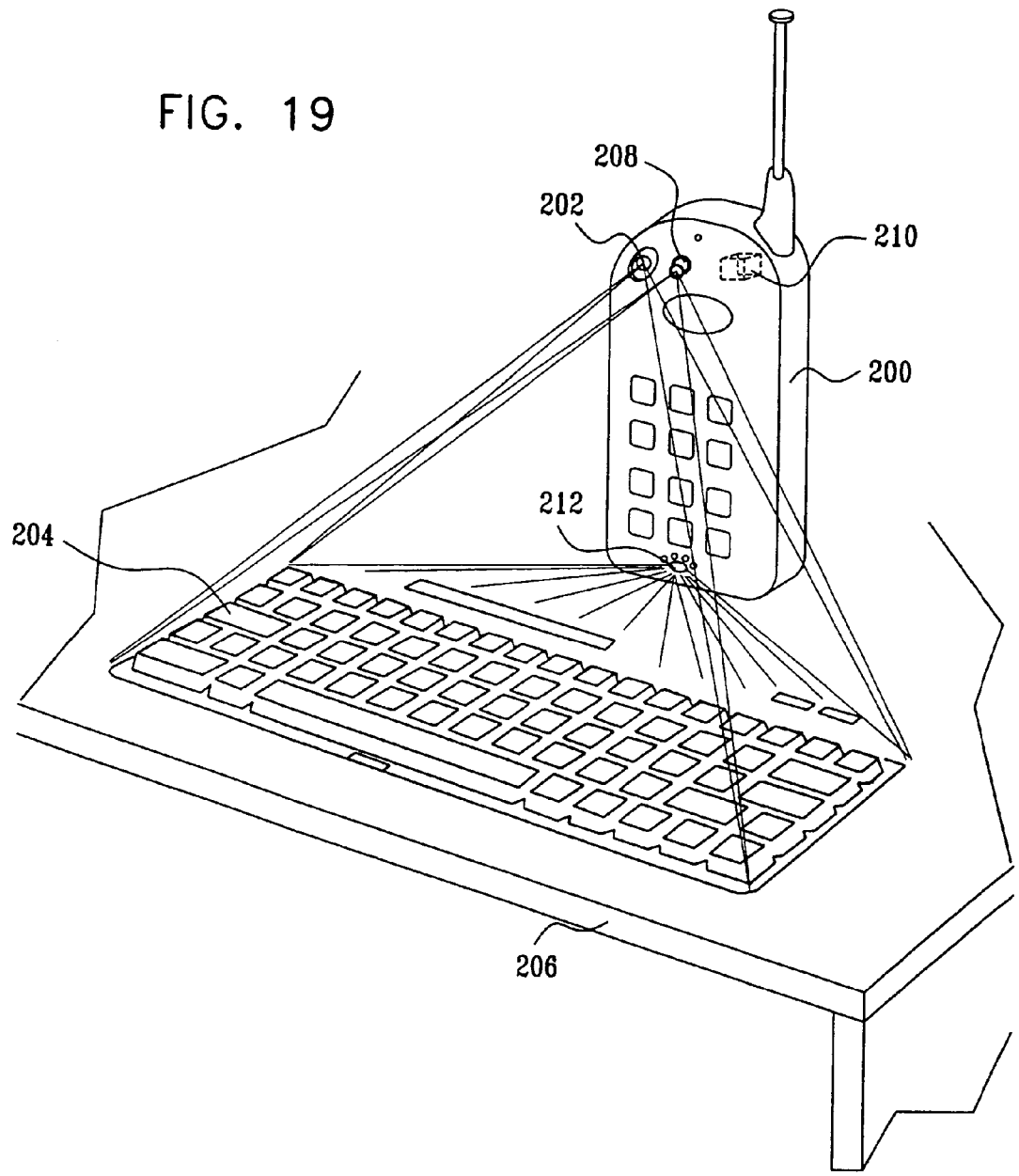
FIG. 19 is a simplified pictorial illustration of a mobile telephone including a projected keyboard functionality in accordance with a preferred embodiment of the present invention.

Reference is now made to FIG. 19, which is a simplified pictorial illustration of a mobile telephone or other suitable mobile communicator, referred to collectively as a mobile telephone, including a projected keyboard functionality in accordance with a preferred embodiment of the present invention.

As seen in FIG. 19, a modified mobile telephone 200, such as a cellular telephone may be modified to include a projector 202, which is capable of projecting an image 204 of at least part of a keyboard onto an inert surface 206, such as a desktop. At least one sensor 208, such as a CCD or CMOS camera mounted on mobile telephone 200, senses user indicator interaction with specific locations on the image 204 of at least part of the keyboard. Preferably, at least alpha-numeric information generation circuitry 210 is provided within mobile telephone 200 and employs an output from the at least one sensor 208 for providing an at least alpha-numeric output to utilization circuitry 210 which may be located within the telephone 200 or remote therefrom.

In accordance with a preferred embodiment of the present invention, there is provided in operative association with at least one sensor 208, at least one infra-red illuminator 212, directing infra-red radiation over the image 204 of at least part of the keyboard 204 onto the inert surface 206. In this case, the at least one sensor includes at least one infra-red sensor for sensing infra-red light scattered from at least one user indicator (not shown).

Figure 20:
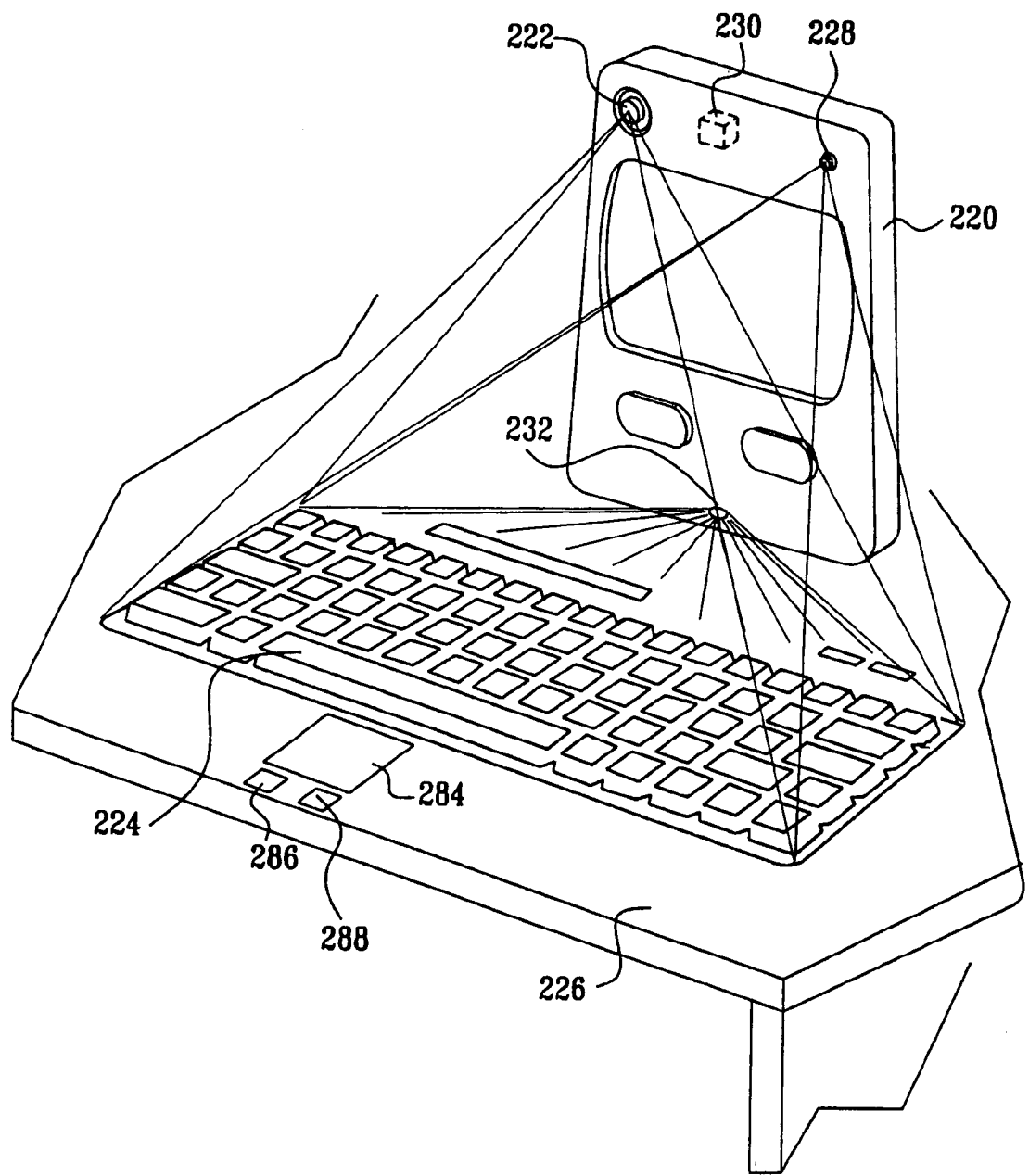
FIG. 20 is a simplified pictorial illustration of a personal digital assistant including a projected keyboard functionality in accordance with a preferred embodiment of the present invention.

Reference is now made to FIG. 20, which is a simplified pictorial illustration of a personal digital assistant including a projected keyboard functionality in accordance with a preferred embodiment of the present invention.

As seen in FIG. 20, a modified personal digital assistant 220, such as a PALM PILOT® may be modified to include a projector 222, which is capable of projecting an image 224 of at least part of a keyboard and a mouse functionality onto an inert surface 226, such as a desktop. At least one sensor 228, such as a CCD or CMOS camera, mounted on personal digital assistant 220, senses user indicator interaction with specific locations on the image 224 of at least part of the keyboard and the mouse functionality.

Preferably, at least alpha-numeric information generation circuitry 230 is provided within personal digital assistant 220 and employs an output from the at least one sensor 228 for providing an at least alpha-numeric output to utilization circuitry which may be located within the personal digital assistant 220 or remote therefrom.

In accordance with a preferred embodiment of the present invention, there is provided in operative association with at least one sensor 228, at least one infra-red illuminator 232, directing infra-red radiation over the image 224 of at least part of the keyboard onto the inert surface 226. In this case, the at least one sensor 228 includes at least one infra-red sensor for sensing infra-red light scattered from at least one user indicator (not shown).

Figure 21:
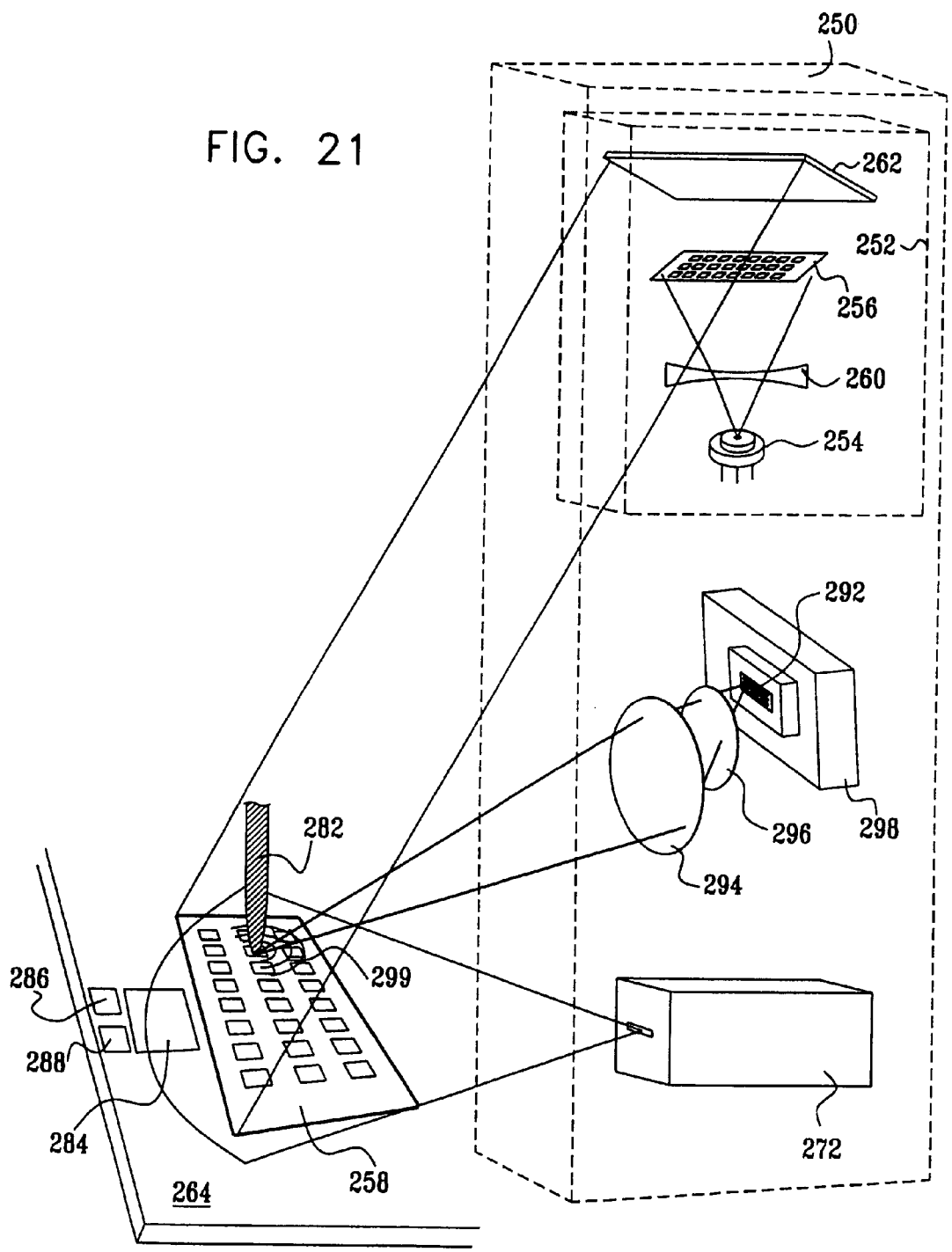
FIG. 21 is a simplified partially pictorial, partially schematic illustration of projection, illumination, detection and information processing functionality useful in the embodiments of FIGS. 19 and 20.
Figure 22:
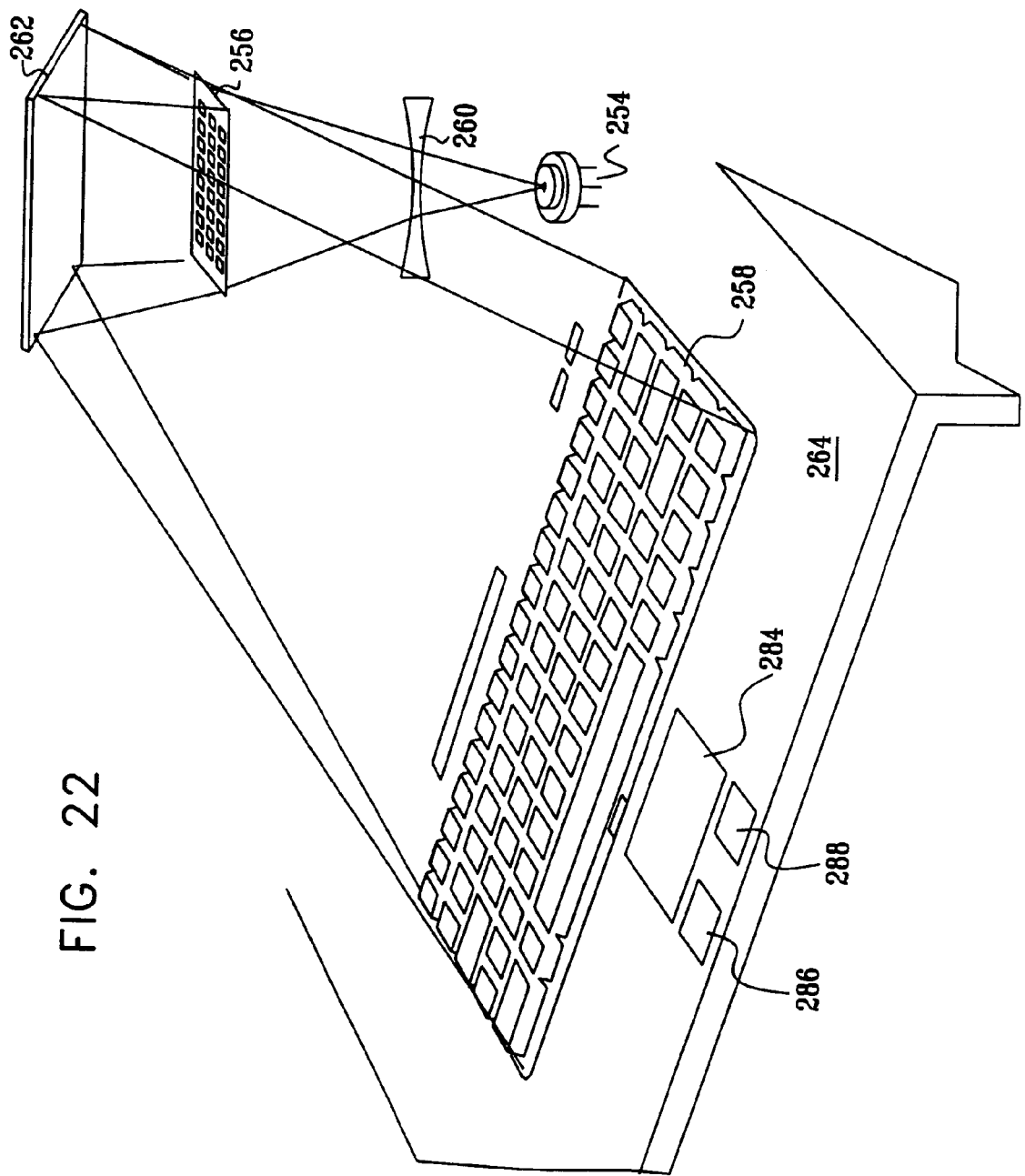
FIG. 22 is an another illustration of the projection functionality of FIG. 21.
Figure 23:
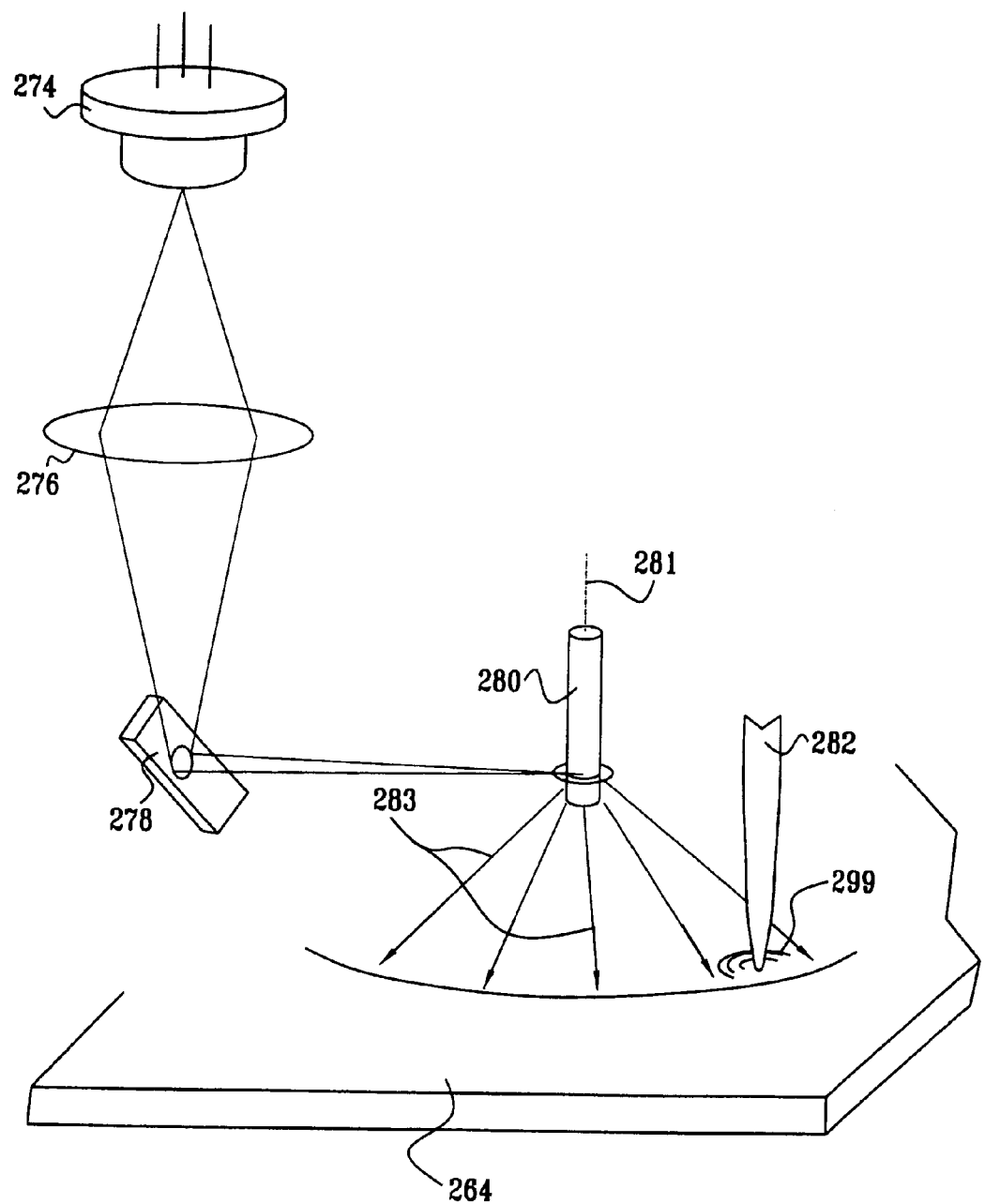
FIG. 23 is a somewhat more detailed illustration of the illumination functionality of FIG. 21 in accordance with a preferred embodiment of the present invention.
Figure 24:
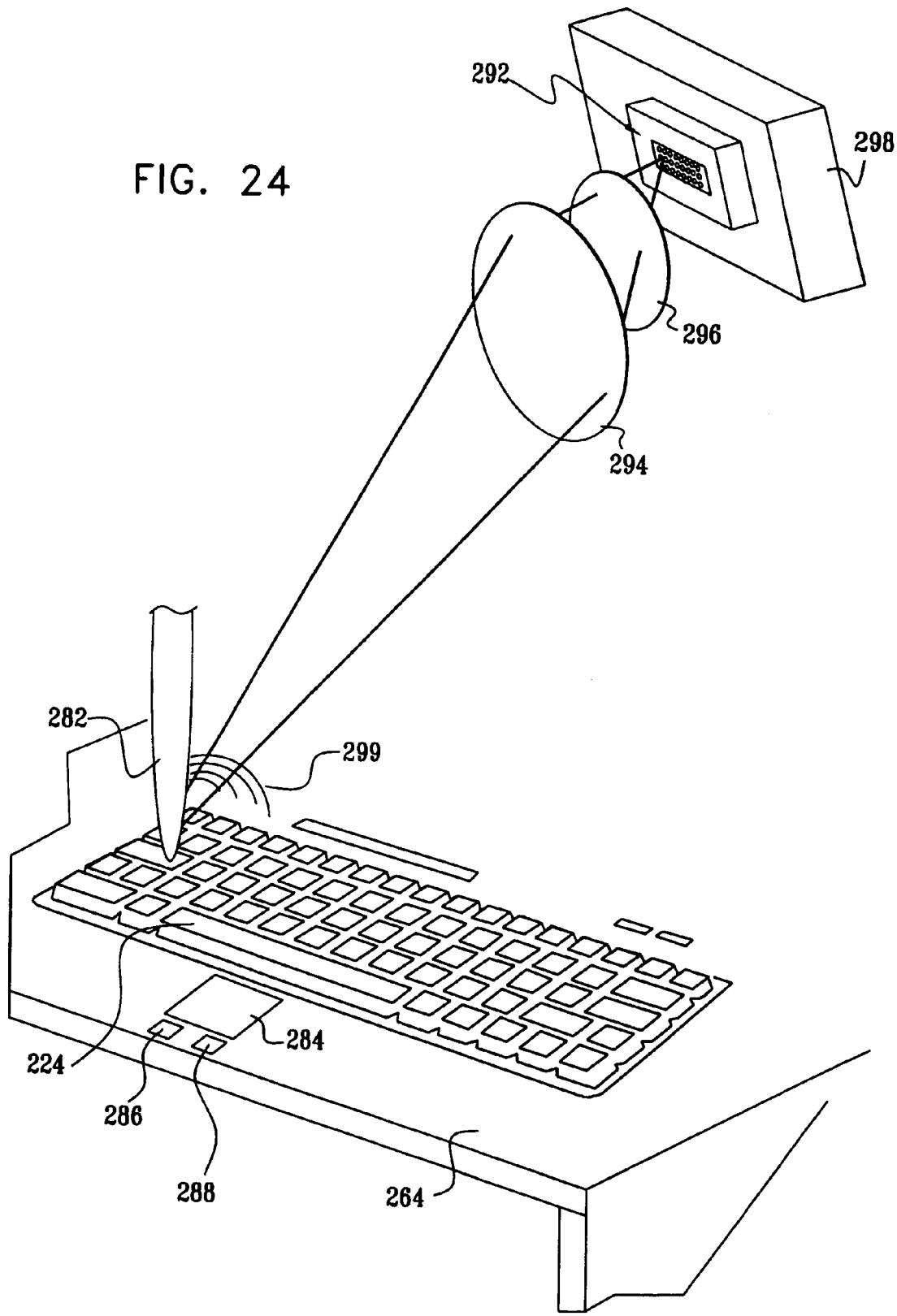
FIG. 24 is a somewhat more detailed illustration of the detection functionality of FIG. 21 in accordance with a preferred embodiment of the present invention.

Reference is now made to FIG. 21, which is a simplified pictorial illustration of projection, illumination and detection functionality useful in the embodiments of FIGS. 19 and 20 and to FIGS. 22, 23 and 24 which show more details thereof.

As seen in FIGS. 21 and 22, in a modified mobile device 250, such as modified telephone 200 (FIG. 19) or a modified personal digital assistant 220 (FIG. 20), a projector 252, such as projector 202 (FIG. 19) or projector 222 (FIG. 20) preferably includes a solid state point light source 254 which illuminates a mask 256 which defines an image 258 of a keyboard and a mouse functionality, preferably including a touchpad 284 and a pair of click buttons 286 and 288, preferably via a negative lens 260. A mirror 262 preferably directs light that has passed through mask 256 onto a projection surface 264, preferably an inert surface, such as a desktop. It is noted that the natural astigmatism of a diode laser light source may be used to advantage in order to obviate the need for a condensing lens upstream of mask 256.

Figure 25:
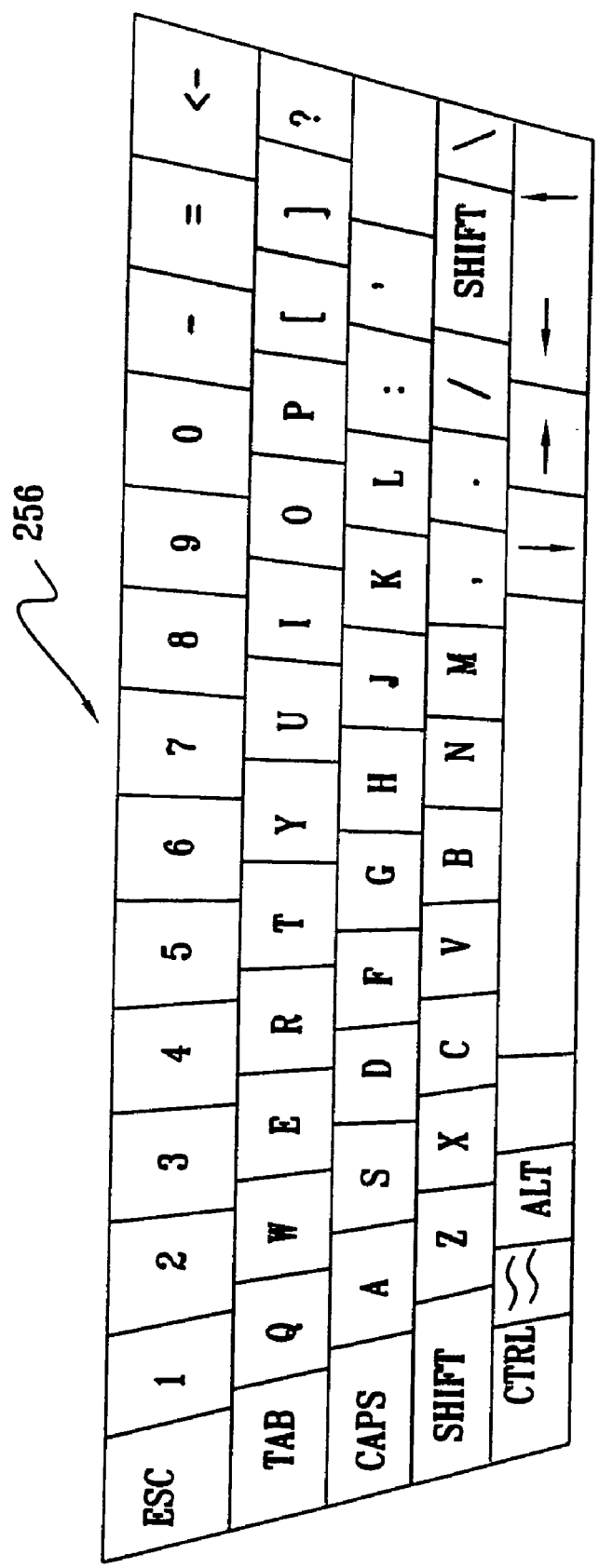
FIG. 25 is a simplified pictorial illustration of a pre-distorted projection mask useful in the functionality of FIGS. 21 and 22.

Mask 256 may be any suitable type of mask and is preferably designed to be pre-distorted, as shown in FIG. 25 in order to compensate for optical distortions in projection and to enable a generally distortion free image of a keyboard to be projected onto an inert surface.

As seen in FIGS. 21 and 23, in modified mobile device 250, an illuminator 272, such as illuminator 212 (FIG. 19) or illuminator 232 (FIG. 20) preferably includes a solid state light source 274 which directs light via a focusing lens 276 and a mirror 278 onto a cylindrical reflecting element 280, which preferably produces radially directed illumination 283 about a longitudinal axis 281 of the cylindrical reflecting element 280. The radially directed illumination 283 extends over approximately 180 degrees, generally in a plane generally parallel to the projection surface 264. It is appreciated that the radially directed illumination 283 has a very narrow spread in the direction generally perpendicular to the projection surface 264. It is further appreciated that the radially directed illumination 283 is located very close to the surface of the projection surface 264.

Impingement of the radially directed illumination 283 on a stylus 282 or other use implement or appendage causes light to be scattered or reflected therefrom. It is appreciated that the light is only reflected when the stylus is in close contact with the keyboard 224.

As seen in FIGS. 20, 21, 22 and 24, the mouse functionality, which may also have applicability in all suitable embodiments of the present invention, typically includes a virtual touch pad 284 and virtual right and left click buttons 286 and 288. It is appreciated that the present invention thus provides fall mouse and touchpad functionality.

As seen in FIGS. 21 and 24, in modified mobile device 250, a detector 292, such as detector 208 (FIG. 19) or detector 228 (FIG. 20) preferably includes a CCD camera such as a Sony ICX409AL, a CMOS camera; such as an Omnivision OV7110, a position sensitive detector, such as a Hamamastsu S1880 an array of CCD or CMOS detectors, a series of line detectors, each aligned to view a line of the projected keyboard, or any other suitable detector.

Detector 292 receives light reflected or scattered from stylus 282 preferably via an imaging lens 294 and a filter 296, such as an IR filter. The imaging lens 296 maps the keyboard 224 onto the detector 292. Thus, each point of the keyboard 224 is defined by a given area on the detector 292. An output of detector 292 is supplied to information generation circuitry 298, such as information generation circuitry 210 (FIG. 19) and information generation circuitry 230 (FIG. 20). The information generation circuitry 298 determines the location of the source of the reflected or scattered light 299 thus defining the location of the stylus 282 on the keyboard 224. The location of the stylus 282 indicates which key of the keyboard 224 is being pressed.

Figure 26:
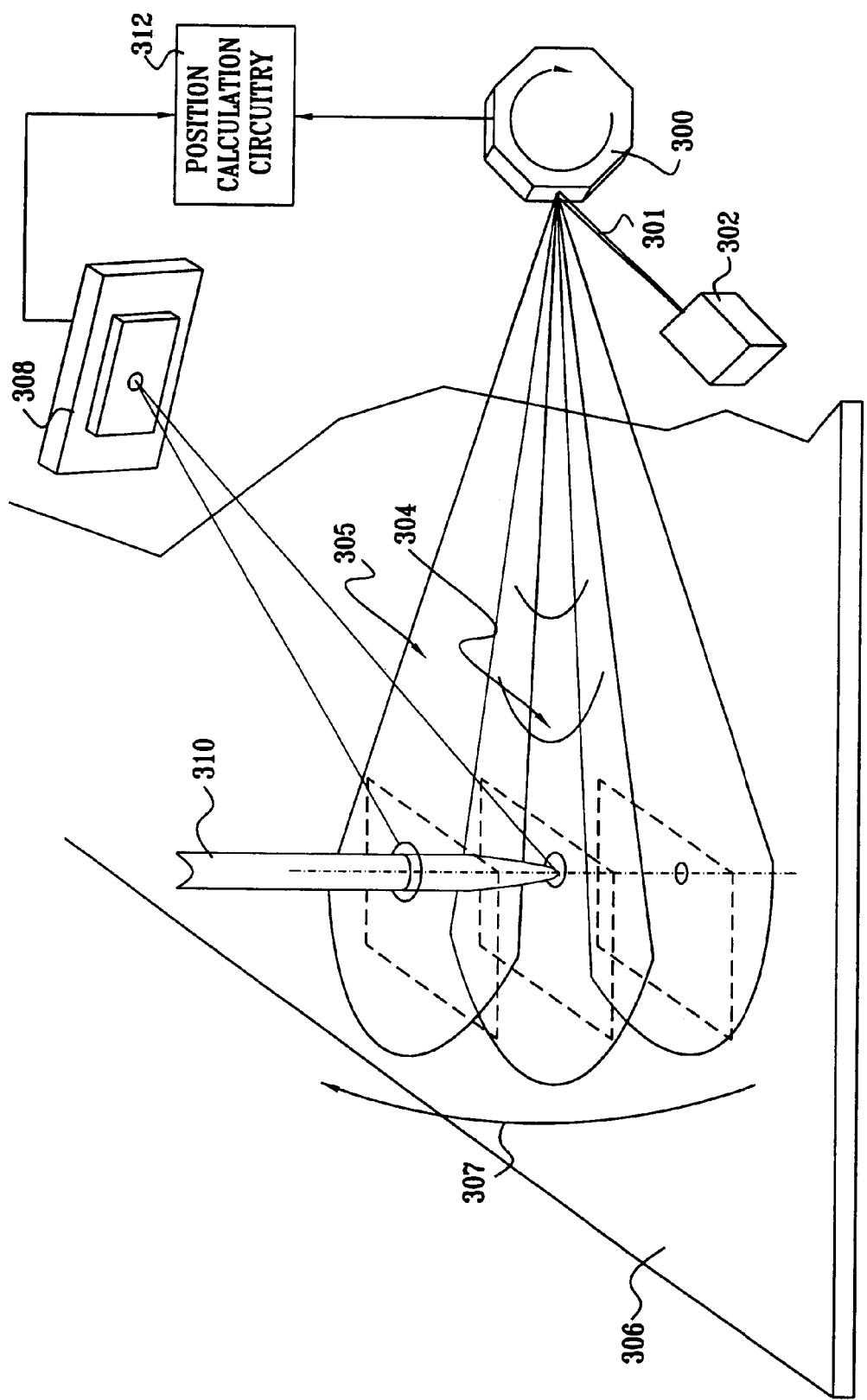
FIG. 26 is a somewhat more detailed illustration of the detection functionality of FIG. 21 in accordance with another preferred embodiment of the present invention and providing detection in three dimensions.

Reference is now made to FIG. 26, which is a somewhat more detailed illustration of the detection functionality of FIG. 21 in accordance with another preferred embodiment of the present invention and providing detection in three dimensions. As seen in FIG. 26, a scanning mirror 300 reflects a line of light 301 produced by a line light source 302 so as to sweep the reflected light 304 into a plane generally perpendicular to the plane of the reference surface 306, thus covering a volume 305. A preferable sweep direction is shown by an arrow 307 in FIG. 26. FIG. 26 also shows the reflected light 304 in three different angular orientations with respect to a reference surface 306.

It is appreciated that the line light source 302 may be identical to the illuminator 272 described hereinabove with respect to FIGS. 21 and 23.

A detector 308, which may be identical to detector 292 (FIG. 24) receives light reflected or scattered from a stylus 310. In the embodiment of FIG. 26, the output of detector 308 and a position indicating output from the scanning mirror 300 are supplied to 3-D position calculation circuitry 312, which correlates the detection of the stylus with the position of the light plane 304. X and Y coordinates of the position of the stylus 310 are determined from the output of the detector 308 while the Z position of the tip of the stylus is determined from the position of the scanning mirror 300 when the light from the stylus is first detected. In this way, the location of the tip of the stylus may be determined to a desired degree of accuracy notwithstanding that the stylus is not in contact with a reference surface, such as surface 306.

Figure 27:
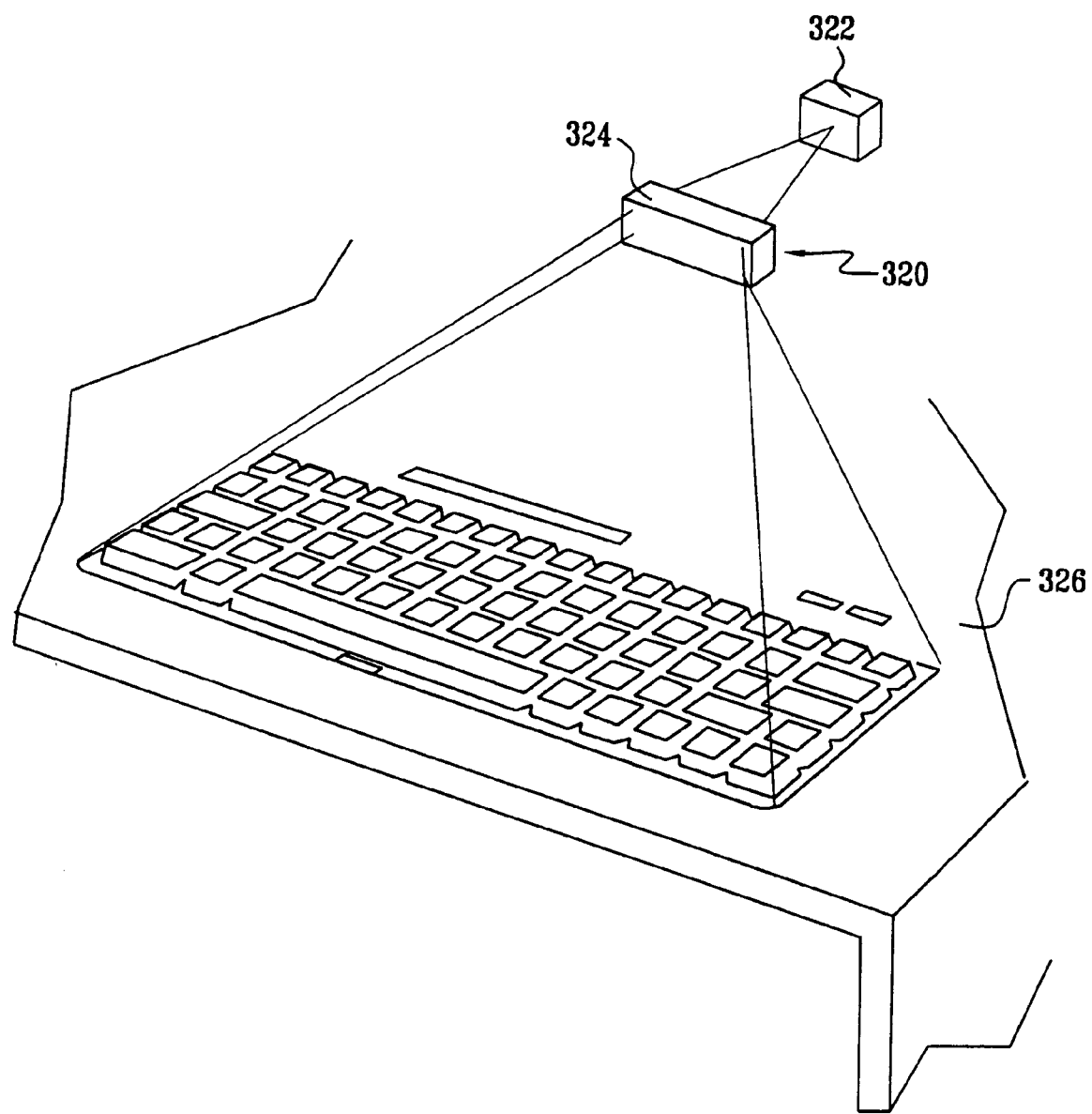
FIG. 27 is a somewhat more detailed illustration of the projection functionality of FIG. 21 in accordance with another preferred embodiment of the present invention.

Reference is now made to FIG. 27, which is a somewhat more detailed illustration of the projection functionality of FIG. 21 in accordance with another preferred embodiment of the present invention. As seen in FIG. 27, a projector 320, such as projector 202 (FIG. 19) or projector 222 (FIG. 20) preferably includes a solid state point light source 322 which illuminates a diffractive optical element 324, which defines an image 326 of a keyboard, preferably via a lens (not shown).

Figure 28:
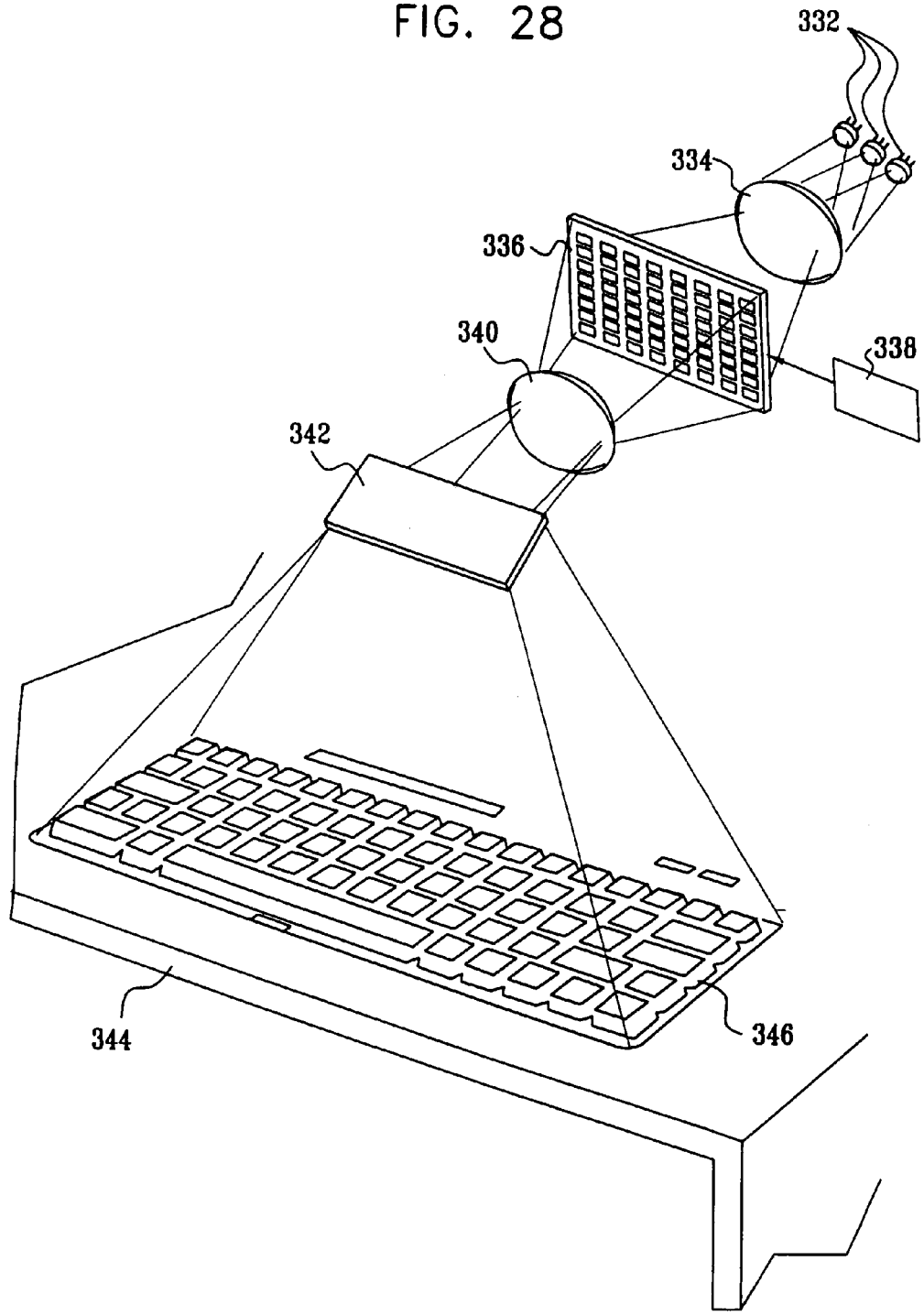
FIG. 28 is a somewhat more detailed illustration of the projection functionality of FIG. 21 in accordance with yet another preferred embodiment of the present invention and providing dynamic projection.

Reference is now made to FIG. 28, which is a somewhat more detailed illustration of the projection functionality of FIG. 21 in accordance with yet another preferred embodiment of the present invention and providing dynamic projection. As seen in FIG. 28 one or more solid state light sources 332 direct light through a condensing lens 334 onto a dynamic mask 336, such as a spatial light modulator, which receives a modulating input from an image generator 338.

The dynamically modulated light output from dynamic mask 336 passes through a projection lens 340 and preferably is reflected by a mirror 342 onto a surface 344, thereby defining an image 346 of a keyboard on surface 344. It is appreciated that the image of the keyboard may be varied by changing the modulation of the dynamic mask 336, to accommodate different fonts, languages or specific user requirements and to provide a selectable and variable touch screen. In this manner a user interface may be partially or entirely provided using the projected image provided using the dynamic mask 336.

Figure 29:
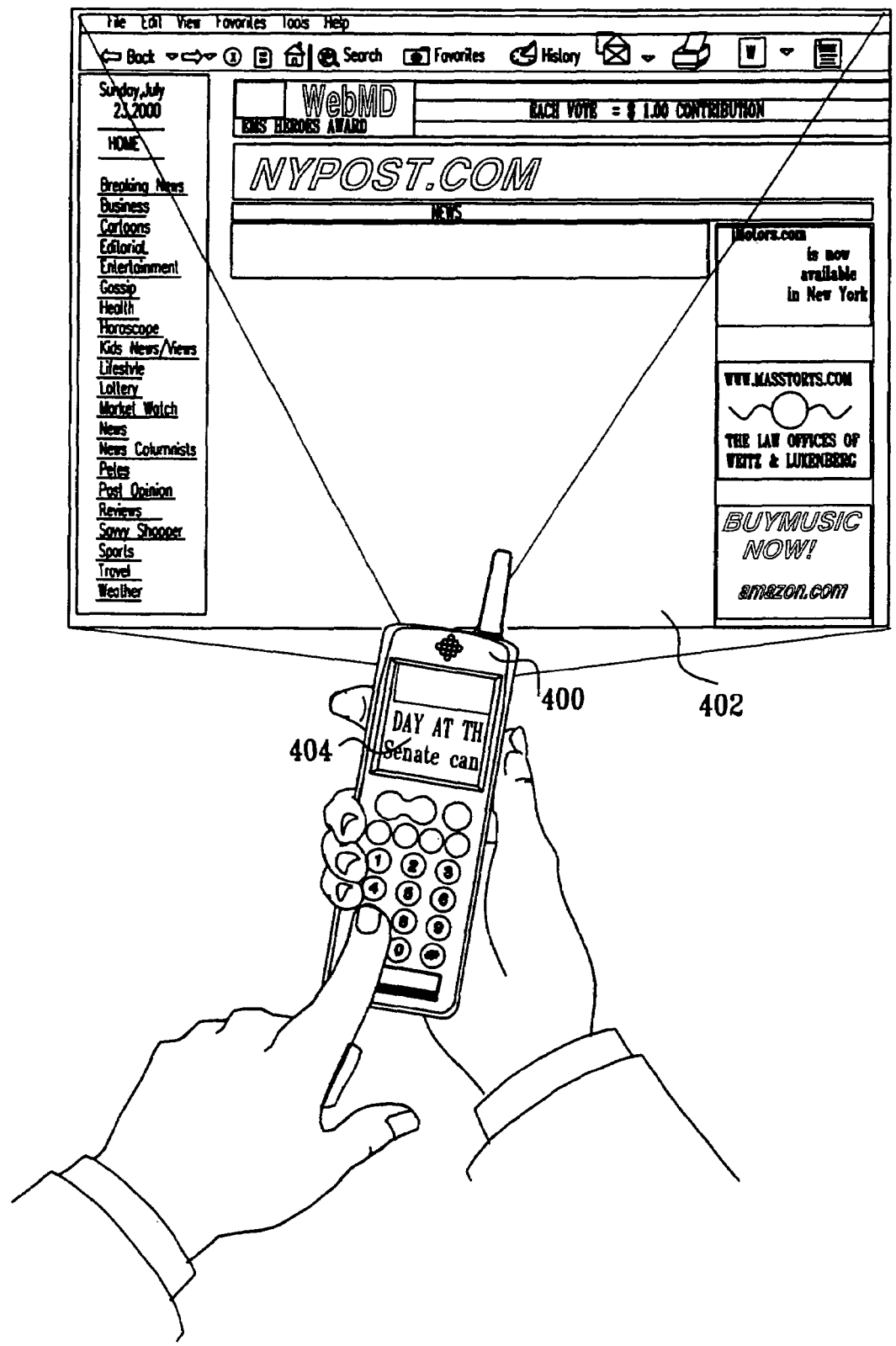
FIG. 29 is a simplified pictorial illustration of a mobile web browsing functionality employing an embodiment of the present invention.

Reference is now made to FIG. 29, which is simplified pictorial illustration of a mobile web browsing functionality employing an embodiment of the present invention. As seen in FIG. 29, a suitably equipped mobile communicator, such as a mobile telephone 400 which is equipped with a projector, similar to the telephone shown in FIG. 19 and projector shown in FIG. 28 and described hereinabove, may be used to project an image 402 of a web page onto a suitable projection surface, such as a wall. This provides ease of reading the web page which otherwise might not be legible in its usual HTML format on a display 404 built into the telephone 400. In this way, special formatting of web pages for mobile telephone web access may be obviated.

Figure 30:
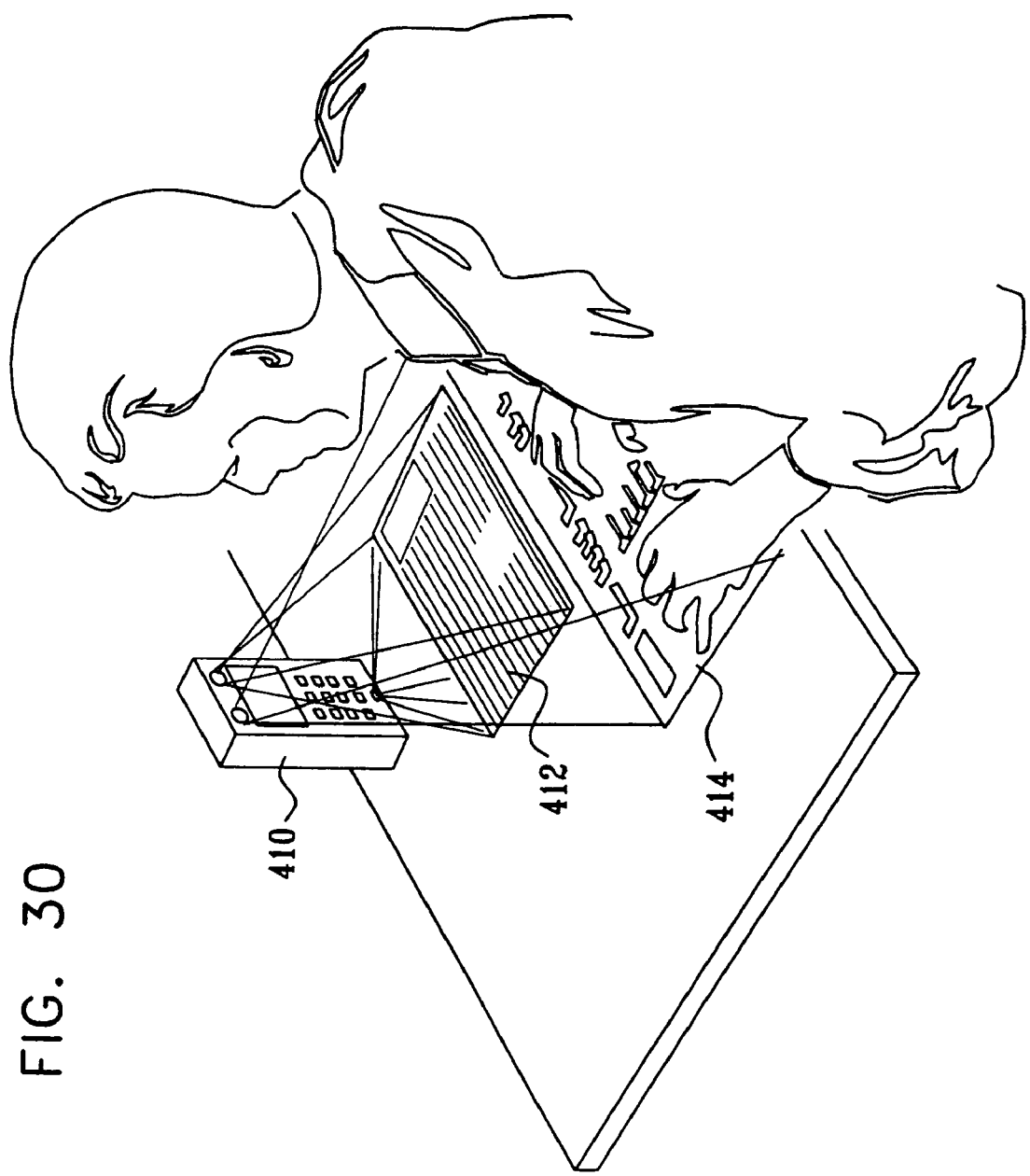
FIG. 30 is a simplified pictorial illustration of an interactive mobile computing functionality employing an embodiment of the present invention.

Reference is now made to FIG. 30, which is a simplified pictorial illustration of an interactive mobile computing functionality employing an embodiment of the present invention. As seen in FIG. 30, a mobile communicator 410, such as a personal digital assistant or a pocket PC, such as the PDA shown in FIG. 20 and described hereinabove, may be used both to display content at a display location 412 and to enable user input via a virtual keyboard 414 projected thereby. A typical functionality for this embodiment may be a wireless system for email communication.

Figure 31:
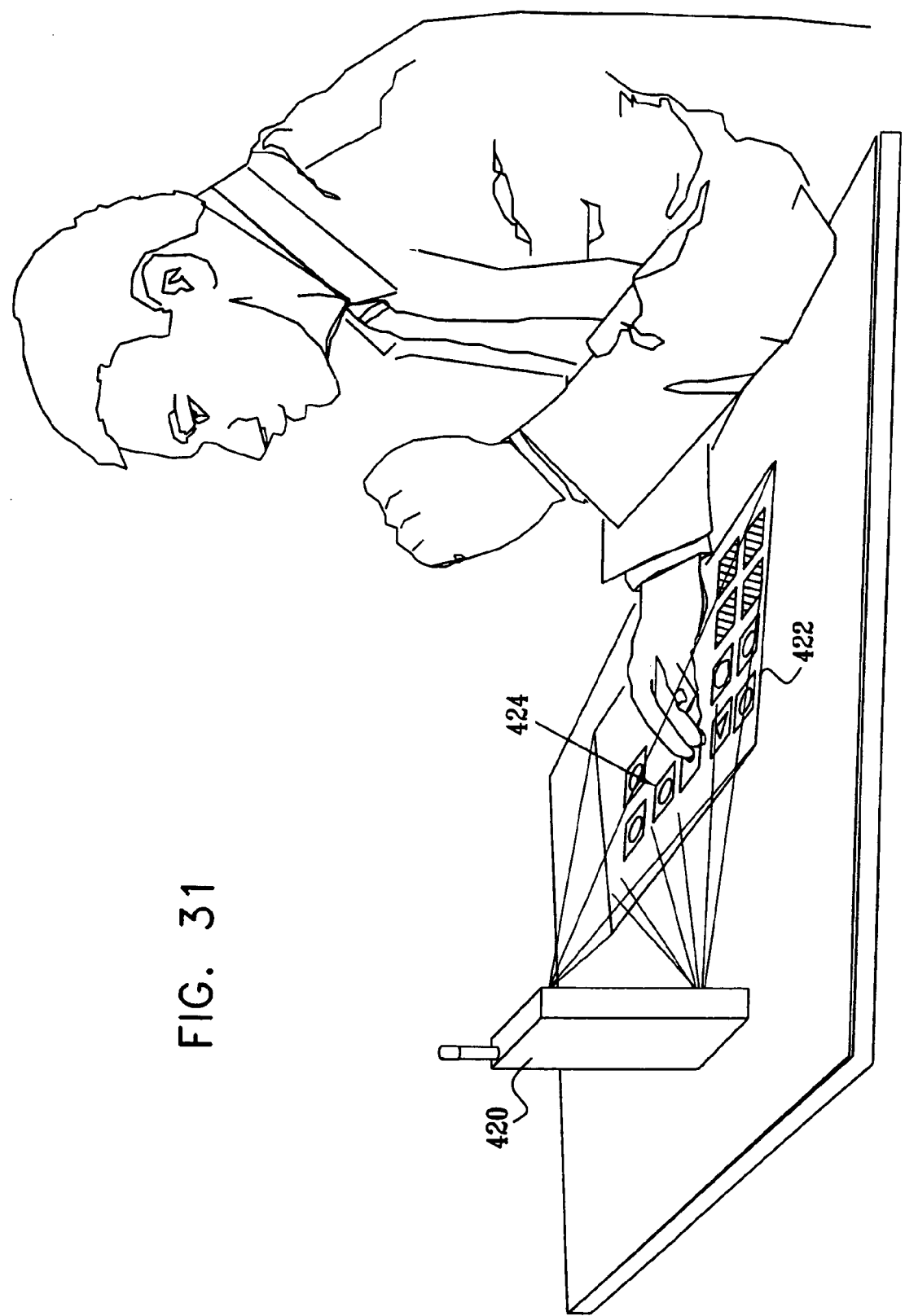
FIG. 31 is a simplified pictorial illustration of an interactive mobile web functionality employing an embodiment of the present invention.

Reference is now made to FIG. 31, which is a simplified pictorial illustration of an interactive mobile web functionality employing another embodiment of the present invention. As seen in FIG. 31, a mobile communicator 420, such as a personal digital assistant or a mobile telephone, such as the PDA shown in FIG. 20 or the telephone shown in FIG. 19, both of which are described hereinabove, may be used both to interactively display content at a display location 422, such as via a virtual touch screen 424 and to enable user input via the virtual touch screen 424. It is appreciated that the virtual touch screen 424 may be provided by at least partial overlap between regions of projection and detection using apparatus such as that described hereinabove in the context of a virtual keyboard, for example in FIGS. 21-28. In this application, the image of a standard keyboard is replaced by a touch screen type image. It is appreciated that the dynamic projection arrangement of FIG. 28 is particularly suitable for this application. A typical functionality for this embodiment may be a wireless system for mobile commerce communication.

It will be appreciated by persons skilled in the art that the present invention is not limited by what has been particularly shown and described hereinabove. Rather the scope of the present invention includes both combinations and sub combinations of the features described hereinabove as well as modifications and variations thereof which would occur to a person of skill in the art upon reading the foregoing description and which are not in the prior art.

What is claimed is:

1. Apparatus for inputting at least alpha-numeric information into a computer comprising:
a projector, projecting an image of at least part of a keyboard, including a plurality of keyboard locations, onto an inert surface;
a single two dimensional sensor comprising:
at least one infrared illuminator generating a generally planar beam generally parallel to said inert surface;
an array of discrete sensing elements; and
at least one lens operative to image light scattered by a user indicator at a region of said generally planar beam overlying each of said plurality of keyboard locations onto a corresponding at least one of said array of discrete sensing elements, said at least one lens mapping said plurality of keyboard locations onto said array of discrete sensing elements, such that each of said plurality of keyboard locations on said image of at least part of a keyboard is defined by at least one of said array of discrete sensing elements,
said single two dimensional sensor sensing user indicator interaction with specific ones of said plurality of keyboard locations on said image of at least part of a keyboard; and
at least alpha-numeric information generation circuitry receiving an output from said single two dimensional sensor for providing an at least alpha-numeric output on the basis of said mapping.

2. Apparatus according to claim 1 and also comprising a wireless communicator operative to provide said at least alpha-numeric output in a wireless manner to a receiver.

3. Apparatus according to claim 2 and wherein said wireless communicator comprises a cellular telephone.

4. Apparatus according to claim 3 and wherein said cellular telephone includes a housing, in which housing are mounted said projector, said single two dimensional sensor and said at least alpha-numeric information generation circuitry.

5. Apparatus according to claim 1 and also comprising a personal digital assistant.

6. Apparatus according to claim 5 and wherein said personal digital assistant includes a housing, in which housing are mounted said projector, said single two dimensional sensor and said at least alpha-numeric information generation circuitry.

7. Apparatus according to claim 1 and wherein said at least one infrared illuminator is operative to direct infrared radiation over said image of at least part of a keyboard and said single two dimensional sensor also comprises at least one infrared sensor for sensing infrared light scattered from at least one user indicator.

8. Apparatus according to claim 2 and wherein said at least one infrared illuminator is operative to direct infrared radiation over said image of at least part of a keyboard and said single two dimensional sensor also comprises at least one infrared sensor for sensing infrared light scattered from at least one user indicator.

9. Apparatus according to claim 3 and wherein said single two dimensional sensor comprises at least one visible light illuminator, directing visible radiation over said image of at least part of a keyboard onto an inert surface and at least one visible radiation sensor for sensing visible light scattered from at least one user indicator.

10. Apparatus according to claim 4 and wherein said single two dimensional sensor comprises at least one visible light illuminator, directing visible radiation over said image of at least part of a keyboard onto an inert surface and at least one visible radiation sensor for sensing visible light reflected from at least one user indicator.

11. Apparatus according to claim 1 and wherein said user indicator is a user finger.

12. Apparatus according to claim 1 and wherein said user indicator is a user held stylus.

13. Apparatus according to claim 1 and wherein said projector comprises a point light source illuminating a mask defining said image of at least part of a keyboard.

14. Apparatus according to claim 13 and also comprising a mirror directing light passing through said mask onto said inert surface.

15. Apparatus according to claim 13 and also comprising at least one lens directly receiving light from said point light source through said mask.

16. Apparatus according to claim 13 and wherein said point light source comprises a diode laser.

17. Apparatus according to claim 13 and wherein said mask is formed to define a distorted representation of said image of at least part of a keyboard in order to compensate for distortions in said projector.

18. Apparatus according to claim 13 and wherein said mask is a dynamically changeable mask.

19. Apparatus according to claim 1 and wherein said infrared illuminator comprises a cylindrical reflecting element receiving light from a point source and producing a generally flat, generally radially-directed light distribution.

20. Apparatus according to claim 8 and wherein said infrared illuminator comprises a cylindrical reflecting element receiving light from a point source and producing a generally flat, generally radially-directed light distribution.

21. Apparatus according to claim 9 and wherein said visible light illuminator comprises a cylindrical reflecting element receiving light from a point source and producing a generally flat, generally radially-directed light distribution.

22. Apparatus according to claim 10 and wherein said visible light illuminator comprises a cylindrical reflecting element receiving light from a point source and producing a generally flat, generally radially-directed light distribution.

23. Apparatus according to claim 1 and wherein said single two dimensional sensor comprises a position sensitive detector and at least one lens operative to image a region overlying each of a plurality of keyboard locations onto a corresponding region on said position sensitive detector.

24. Apparatus according to claim 7 and wherein said at least one infrared illuminator is operative to direct infrared radiation at a plurality of levels over said image of at least part of a keyboard and said at least one infrared sensor is operative to sense infrared light scattered from at least one user indicator at a plurality of locations therealong.

25. Apparatus according to claim 8 and wherein said at least one infrared illuminator is operative to direct infrared radiation at a plurality of levels over said image of at least part of a keyboard and said at least one infrared sensor is operative to sense infrared light reflected from at least one user indicator at a plurality of locations therealong.

26. Apparatus according to claim 9 and wherein said at least one visible light illuminator is operative to direct visible radiation at a plurality of levels over said image of at least part of a keyboard and said at least one visible radiation sensor is operative to sense visible radiation light scattered from at least one user indicator at a plurality of locations therealong.

27. Apparatus according to claim 10 and wherein said at least one visible light illuminator is operative to direct visible radiation at a plurality of levels over said image of at least part of a keyboard and said at least one visible radiation sensor is operative to sense visible radiation light reflected from at least one user indicator at a plurality of locations therealong.

28. Apparatus according to claim 1 and wherein said projector comprises a diffractive optical element, which when illuminated produces said image of at least part of a keyboard onto said inert surface.

29. Apparatus according to claim 1 and wherein said projector comprises a spatial light modulator, which when illuminated produces said image of at least part of a keyboard onto said inert surface.

30. Apparatus according to claim 29 and wherein said spatial light modulator comprises a dynamic spatial light modulator which is responsive to an electrical input for producing a dynamic image onto said inert surface.

31. Apparatus according to claim 1 and wherein:
said projector projects an image of at least part of a keyboard and of mouse functionality onto said inert surface; and
said single two dimensional sensor senses user indicator interaction with specific locations on said image of said mouse functionality.

32. A method for inputting at least alpha-numeric information into a computer comprising:
projecting an image of at least part of a keyboard, including a plurality of keyboard locations, onto an inert surface;
employing a single two dimensional sensor comprising at least one infrared illuminator generating a generally planar beam generally parallel to said inert surface, an array of discrete sensing elements and at least one lens for sensing user indicator interaction with specific ones of said plurality of keyboard locations on said image of at least part of a keyboard and imaging light scattered by a user indicator at a region of said generally planar beam overlying each of said plurality of keyboard locations onto a corresponding at least one of said array of discrete sensing elements, said at least one lens mapping said plurality of keyboard locations onto said array of discrete sensing elements, such that each of said plurality of keyboard locations on said image of at least part of a keyboard is defined by at least one of said array of discrete sensing elements; and
receiving an output from said single two dimensional sensor indicating sensed user indicator interaction for providing an at least alpha-numeric output on the basis of said mapping.

33. A method according to claim 32 and also comprising providing said at least alpha-numeric output in a wireless manner to a receiver.

34. A method according to claim 32 and wherein said sensing comprises directing infrared radiation over said image of at least part of a keyboard on an inert surface and sensing infrared light scattered from at least one user indicator.

35. A method according to claim 32 and wherein said sensing comprises directing visible radiation over said image of at least part of a keyboard on an inert surface and sensing visible light scattered from at least one user indicator.

36. A method according to claim 32 and wherein said user indicator is a user finger.

37. A method according to claim 32 and wherein said user indicator is a user held stylus.

38. A method according to claim 34 and wherein said directing comprises reflecting light from a point source and producing a generally flat, generally radially-directed light distribution.

39. A method according to claim 35 and wherein said directing comprises reflecting light from a point source and producing a generally flat, generally radially-directed light distribution.

40. A method according to claim 32 and wherein said sensing comprises position sensitive detecting and imaging of a region overlying each of a plurality of keyboard locations onto a corresponding region on a position sensing detector.

41. A method according to claim 34 and wherein said directing includes directing infrared radiation at a plurality of levels over said image of at least part of a keyboard and said infrared sensing includes sensing infrared light scattered from at least one user indicator at a plurality of locations therealong.

42. A method according to claim 35 and wherein said directing includes directing visible radiation at a plurality of levels over said image of at least part of a keyboard and said visible sensing includes sensing visible light scattered from at least one user indicator at a plurality of locations therealong.

43. A method according to claim 32 and wherein said projecting comprises illuminating a diffractive optical element to produce said image of at least part of a keyboard onto said inert surface.

44. A method according to claim 32 and wherein said projecting comprises illuminating a spatial light modulator to produce said image of at least part of a keyboard onto said inert surface.

45. A method according to claim 44 and wherein said projecting comprises illuminating a dynamic spatial light modulator which is responsive to an electrical input for producing a dynamic image onto said inert surface.

46. A method according to claim 32 and wherein:

said projecting projects an image of at least part of a keyboard and of mouse functionality onto said inert surface; and said sensing senses user indicator interaction with specific locations on said image of said mouse functionality.

* * * * *

UNITED STATES PATENT AND TRADEMARK OFFICE
CERTIFICATE OF CORRECTION

PATENT NO. : 7,305,368 B2 Page 1 of 1
APPLICATION NO. : 11/314324
DATED : December 4, 2007
INVENTOR(S) : Klony Lieberman et al.

It is certified that error appears in the above-identified patent and that said Letters Patent is hereby corrected as shown below:

On title page, insert, item --(30) Foreign Application Priority Data
May 29, 2000 (IL) .................. 136432--

Signed and Sealed this

Eighth Day of April, 2008

JON W. DUDAS
*Director of the United States Patent and Trademark Office*